United States Patent

Habib et al.

[11] Patent Number: 5,825,356
[45] Date of Patent: Oct. 20, 1998

[54] HELP SYSTEM WITH SEMITRANSPARENT WINDOW FOR DISABLING CONTROLS

[75] Inventors: Dennis M. Habib, Redmond, Wash.; Mindy J. Engelberg, Coarsegold, Calif.; Kathryn A. McNutt, Des Moines, Wash.; Colby E. Kinser, Woodinville, Wash.; Charles E. Lynch, II, North Bend, Wash.; Chauncey L. Williams, Redmond, Wash.

[73] Assignee: Wall Data Incorporated, Kirkland, Wash.

[21] Appl. No.: 617,440

[22] Filed: Mar. 18, 1996

[51] Int. Cl.⁶ ........................................ G06F 3/00
[52] U.S. Cl. ............................ 345/338; 345/344
[58] Field of Search .................. 395/326–358; 434/118; 345/326–358

[56] References Cited

U.S. PATENT DOCUMENTS

| | | | |
|---|---|---|---|
| 5,235,679 | 8/1993 | Yoshizawa et al. | 395/336 |
| 5,377,319 | 12/1994 | Kitahara et al. | 395/338 |
| 5,388,993 | 2/1995 | McKiel et al. | 395/336 X |
| 5,469,540 | 11/1995 | Powers, III et al. | 395/336 X |
| 5,481,667 | 1/1996 | Bieniek et al. | 395/336 |
| 5,488,685 | 1/1996 | Palmer et al. | 395/336 |
| 5,513,308 | 4/1996 | Mori | 395/337 |
| 5,535,422 | 7/1996 | Chiang et al. | 395/338 |
| 5,550,967 | 8/1996 | Brewer et al. | 395/336 |
| 5,627,958 | 5/1997 | Potts et al. | 395/336 |

OTHER PUBLICATIONS

Craig A. Smith, "Agent Function for Viewpoint–Like Interfaces," *Xerox Disclosure Journal*, vol. 19, No. 6, Nov./Dec. 1994, p. 481.

Piyawadee Sukaviriya, "Dynamic Construction of Animated Help from Application Context," *Proceedings of the ACM SIGGRAPH Symposium on User Interface Software*, Banff, Alberta, Canada, Oct. 17–19, 1988, pp. 190–202.

Hyperwise V. 2.0, User Manual, ©IBM Corp. 1994, 1995.

*Primary Examiner*—John E. Breene

[57] ABSTRACT

An interactive help system allows a user to retrieve information concerning how to complete a particular task in an underlying computer program. Upon selecting the help system, the computer system re-sizes the window of the underlying program and generates a help window containing a list of topics that are available. A help window is created beside the underlying program window that lists those steps required to complete a desired task. The help system disables that portion of the underlying program window containing options that are inappropriate for the user to select at that time in order to complete the desired task. In addition, the help system shows the user how to complete the next step in the list of desired steps. Alternatively, the user can have the help system show the user how to perform all the steps required to complete a given task.

4 Claims, 11 Drawing Sheets

HELP SYSTEM WITH SEMITRANSPARENT WINDOW FOR DISABLING CONTROLS

FIELD OF THE INVENTION

The present invention relates to computer systems in general, and in particular to on-screen help programs.

BACKGROUND OF THE INVENTION

As computers become increasingly complex, the software designed to run on such computers becomes correspondingly powerful. As a result, many programs require significant time and energy to be spent before a user can operate the program at its full potential. To help a user, most computer programs are sold with one or more manuals that describe all the features capable of being performed by the program and how to implement those features. In addition to the written materials, most programs have some sort of "on-screen" help program. These help programs are designed to allow a user to quickly search for information regarding a feature and to present the user with a brief narrative concerning how to accomplish the desired feature.

Despite the apparent simplicity of the on-screen help programs, they suffer from numerous disadvantages that limit their utility. First, most on-screen help systems provide less information than is contained in the corresponding computer manual. Therefore, it is often necessary to read the manual in addition to using the on-screen help program. Secondly, in order to implement a task described by the help program, the user must memorize the steps described, exit the help program and attempt to implement those steps. Because the program may not appear to the user in the same fashion as was described in the help program, it is often difficult to perform the required steps—even after having read the manual or used the on-screen help program. Finally, most on-screen help programs are not context specific. That is, the information provided remains the same regardless of how the underlying program in which help is desired is operating. Because the steps required to implement a feature may vary depending on how the underlying program is operating, the user may be given incorrect or incomplete information.

SUMMARY OF THE INVENTION

To solve the problems associated with prior art on-screen help systems, the present invention is an interactive computerized help system. The help system operates simultaneously with an underlying program being run by a user in order to show the user a sequence of steps required to implement a desired task. After each step has been performed by a user, the step is marked by the help system as being completed. The help system is context sensitive with the underlying program, so that the information or sequence of steps given to the user is tailored to how the underlying program is operating. If the user does not understand how to implement a step, the user can select a "show-me" option that performs the step for the user. Finally, the user can select a "do-it-all" option that shows the user how to perform the entire sequence of steps required to implement a desired task to completion or until user input is required.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is an interactive computer help system that provides information to a user regarding how to complete a desired task. In addition, the computer system will show the user how to perform the steps required to complete the task, if desired.

Figure 1:
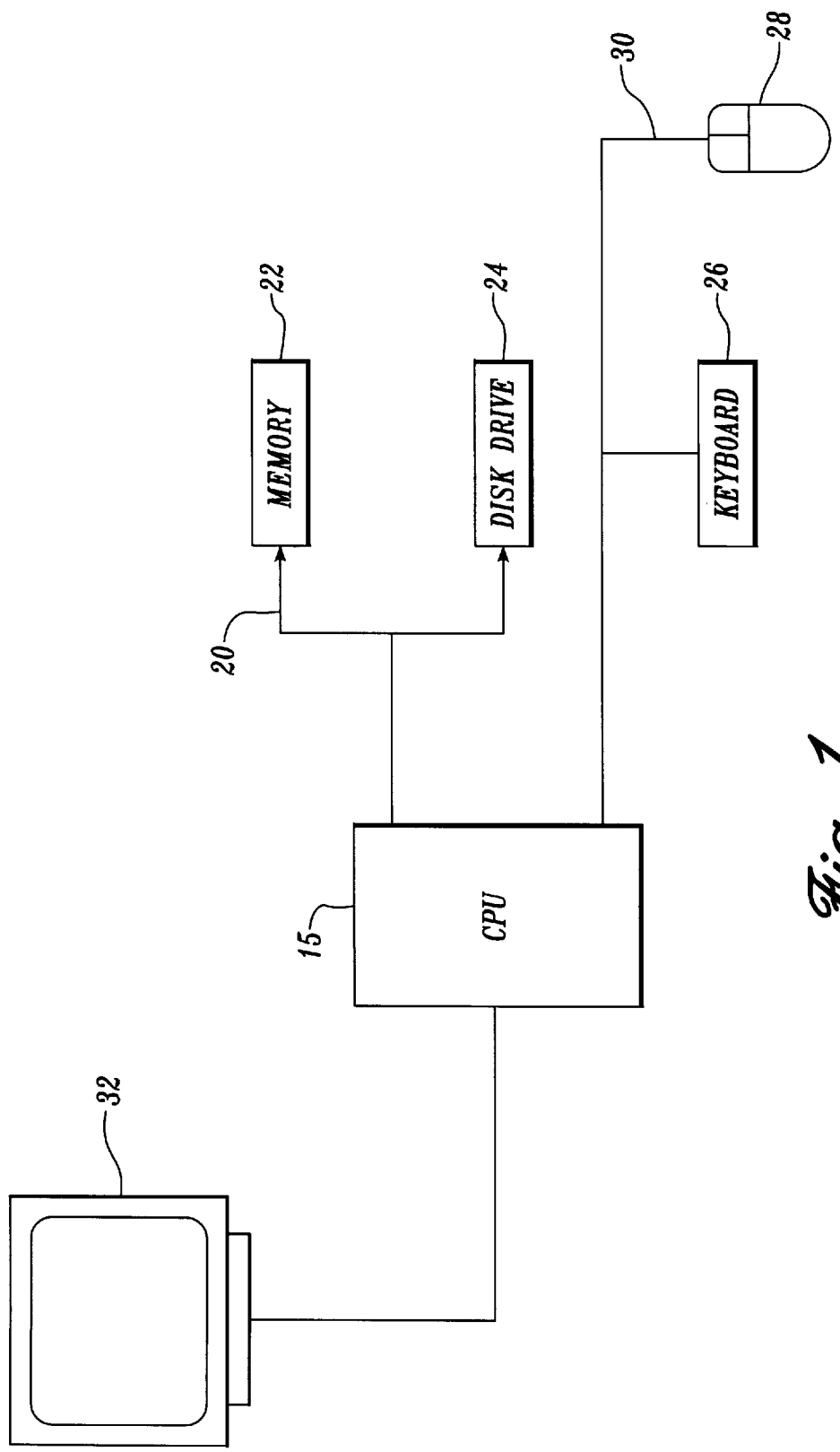
FIG. 1 is a block diagram of a computer system in which the help system of the present invention is implemented.

The help system of the present invention is designed to operate with a conventional computer system of the type shown in FIG. 1. The computer system includes a central processing unit (CPU) 15 having its own internal memory 22 and digital storage mechanism such as a hard disk drive 24. The disk drive and memory are coupled to the CPU via an internal data bus 20. Commands are entered into the computer system via a keyboard 26 and/or a pointing device, such as a mouse 28, which are coupled to the CPU 15 by a set of leads 30. The computer system may be coupled to other similar computer systems by a local area network (not shown). Programs executed by the CPU preferably use a graphical user interface that is displayed on a monitor 32. An example of a graphical user interface is the Windows® operating system produced by the Microsoft Corporation.

As will be explained in further detail below, the help system of the present invention comprises a computer program that is executed by the CPU 15 simultaneously with the program in which the user desires help. The program resides either in the memory 22 or can be stored on the hard disk drive 24.

Figure 2D:
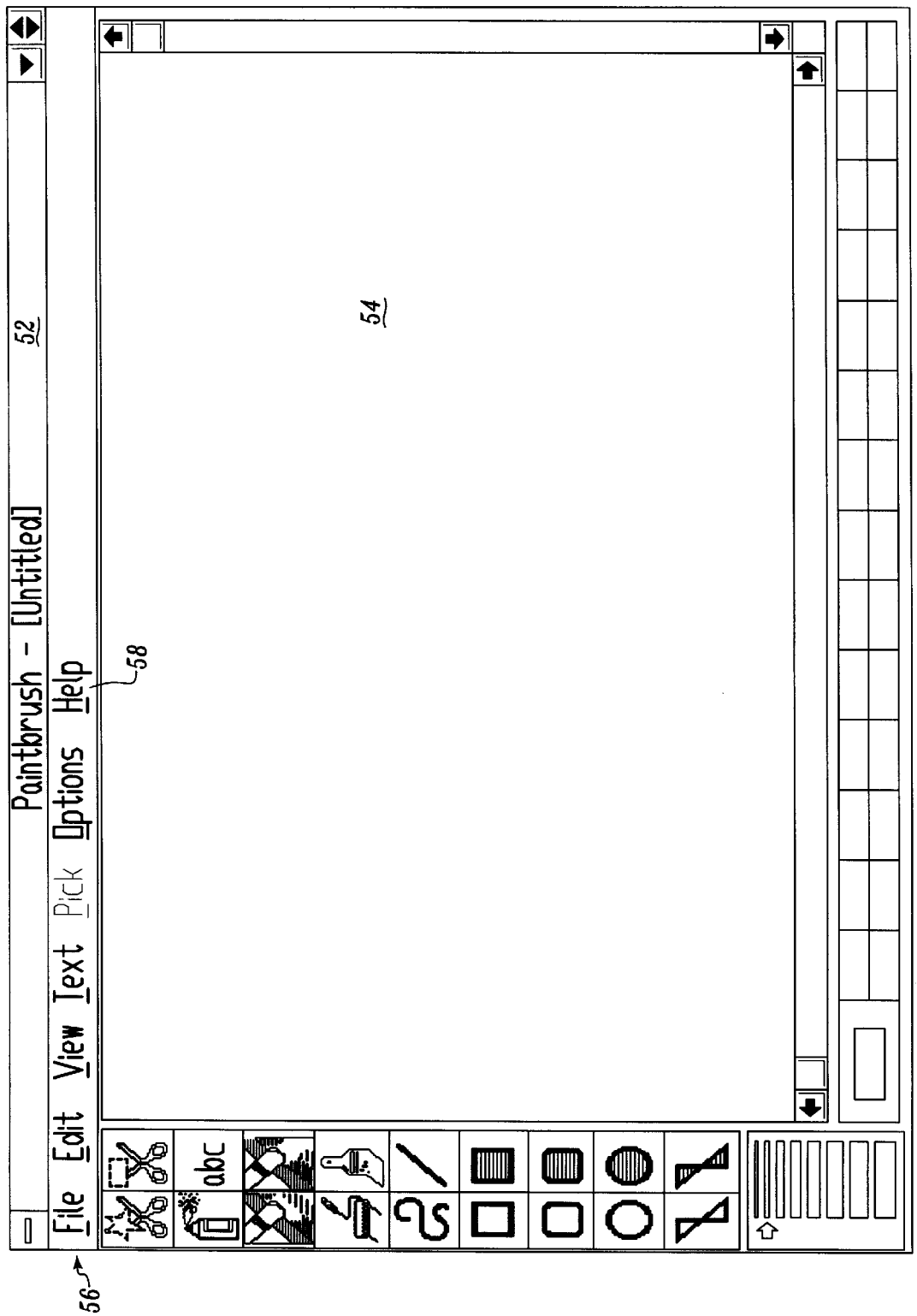
FIGS. 2A–2C are representations of a conventional graphical user interface and a prior art on-screen help program.
Figure 2B:
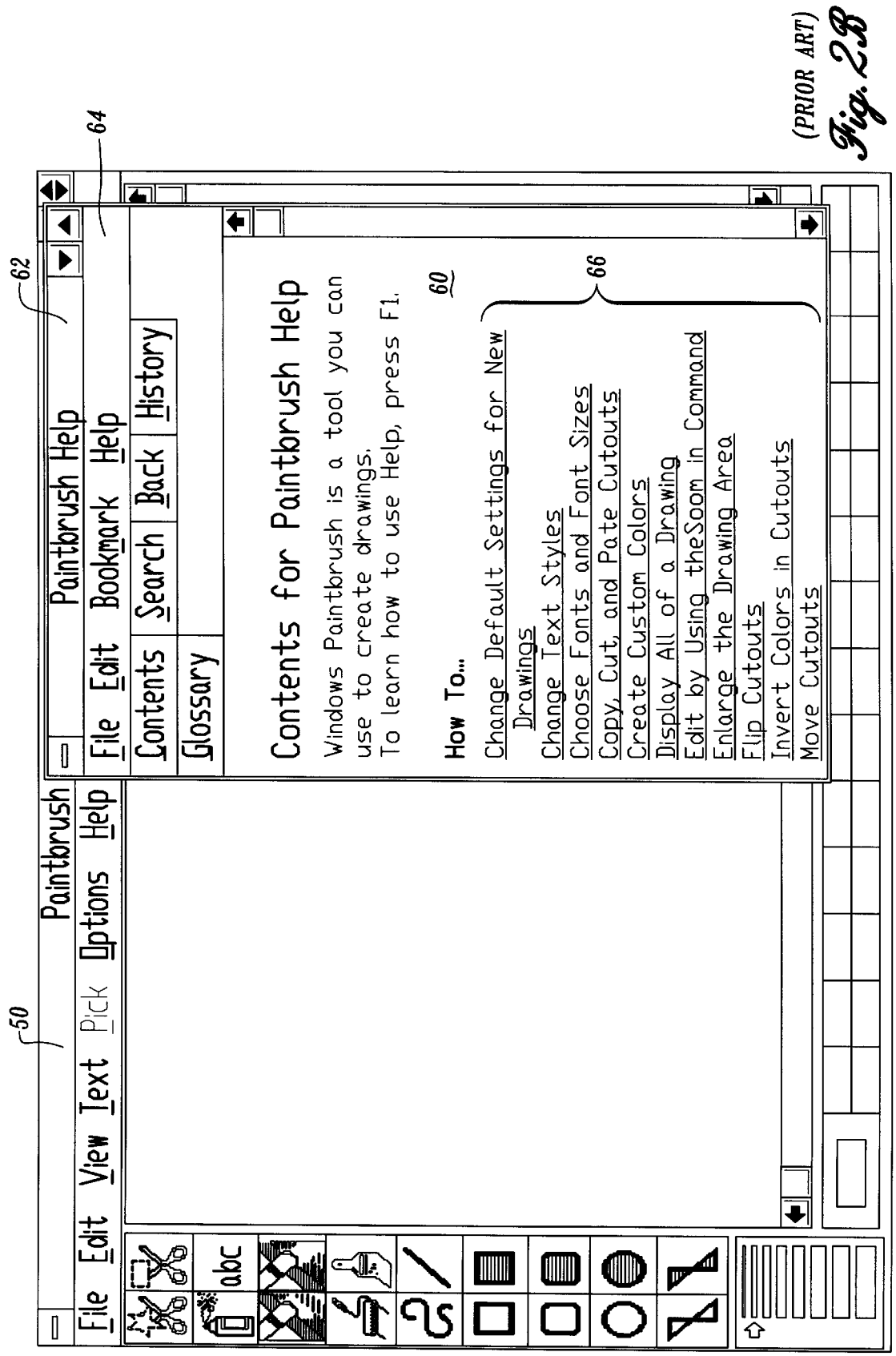
Figure 2B:
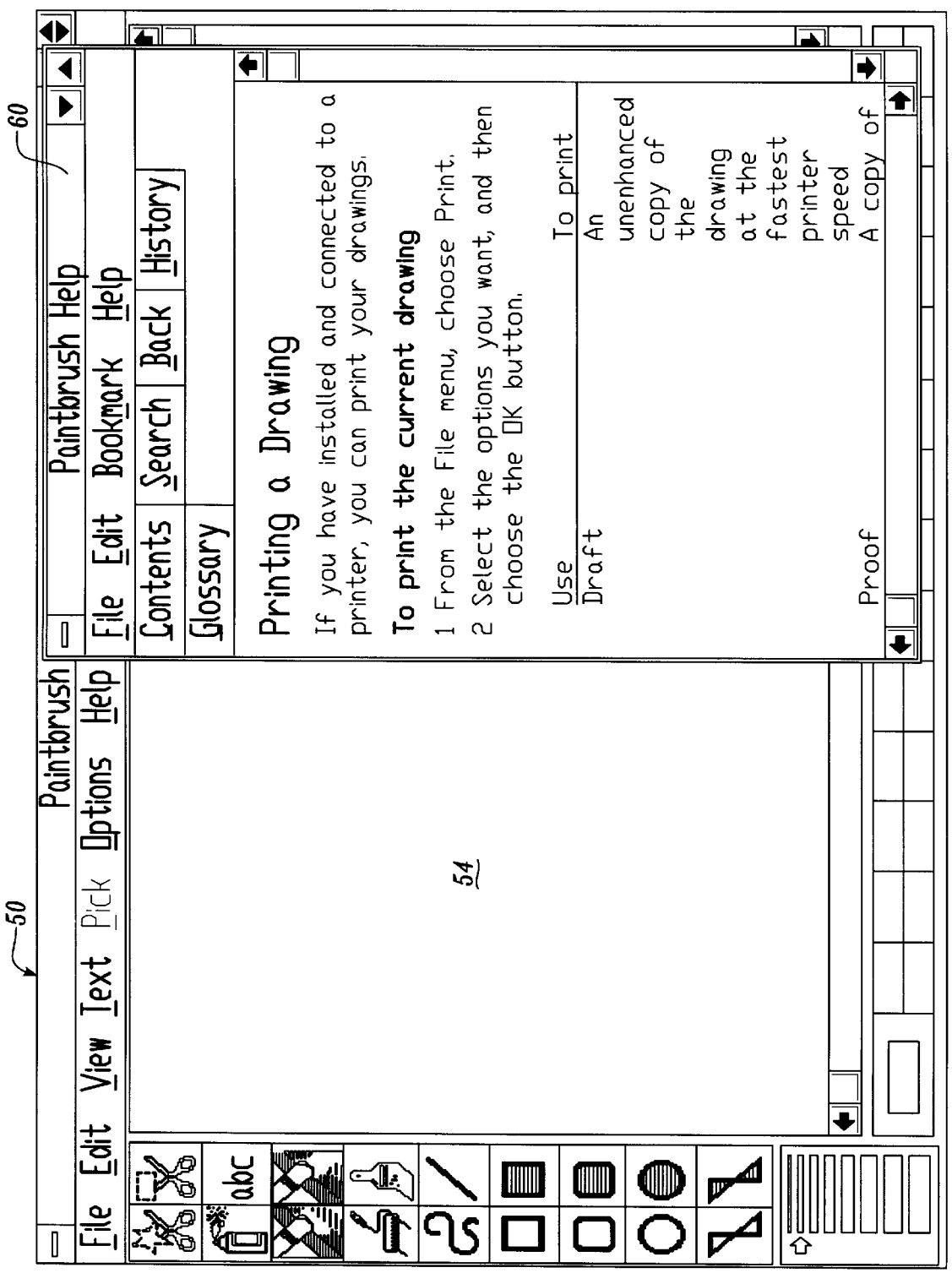

FIGS. 2A–2C show a typical Windows®-based computer program having an on-screen help program. In particular, the program shown is the Paintbrush program produced by Microsoft Corporation. As shown in FIG. 2A, most Windows® programs are displayed in an area of the screen called a window 50. The window has a title bar 52 that provides the user with the title of the program. The title bar surrounds a working area 54 in which the user can perform the task to be completed by the program. In the Paintbrush program shown, the user can create drawings or graphic illustrations within the working area. Below the title bar is a menu bar 56 that allows the user to perform specific tasks such as opening a file, saving work, changing the parameters of the program, selecting preferred options, etc. Typically, the menu bar 56 includes a special help menu 58 that can be selected by a user to obtain information regarding how a particular task can be completed by the program.

FIG. 2B illustrates a conventional prior art on-screen help program that appears when the user selects the help menu. The help program is displayed in its own window 60 that includes a separate title bar 62 and menu bar 64. Within the help window are a list of topics 66 about which the user can obtain information. By moving a mouse pointer over a particular topic and selecting it, the user is provided with a brief description of how a particular task is to be completed.

FIG. 2C shows what happens when the user selects a particular topic from the list of topics displayed in the help window. As indicated above, the user is provided with a short description of the steps the user should implement in order to complete a desired task. In the example shown, the help program provides instructions to the user regarding how a drawing should be printed. To use the information provided, the user reads the instructions, exits the help program, and attempts to implement the steps described in order to complete the desired task, i.e., to print a drawing.

As will be appreciated by viewing FIGS. 2B and 2C, the on-screen help program shown is not integrated with the underlying program in which the help was requested. That is, the help program appears in a separate window that can be moved about by a user, and the text displayed does not change depending upon the operating parameters of the underlying program.

To improve upon the on-screen help system shown in FIGS. 2B and 2C, the present invention is an interactive help program that provides instructions to a user that are context sensitive to the operation of the program in which help is being sought. In addition, the help program of the present invention may provide the user with an illustration of the sequence of steps required to complete a task.

Figure 3:
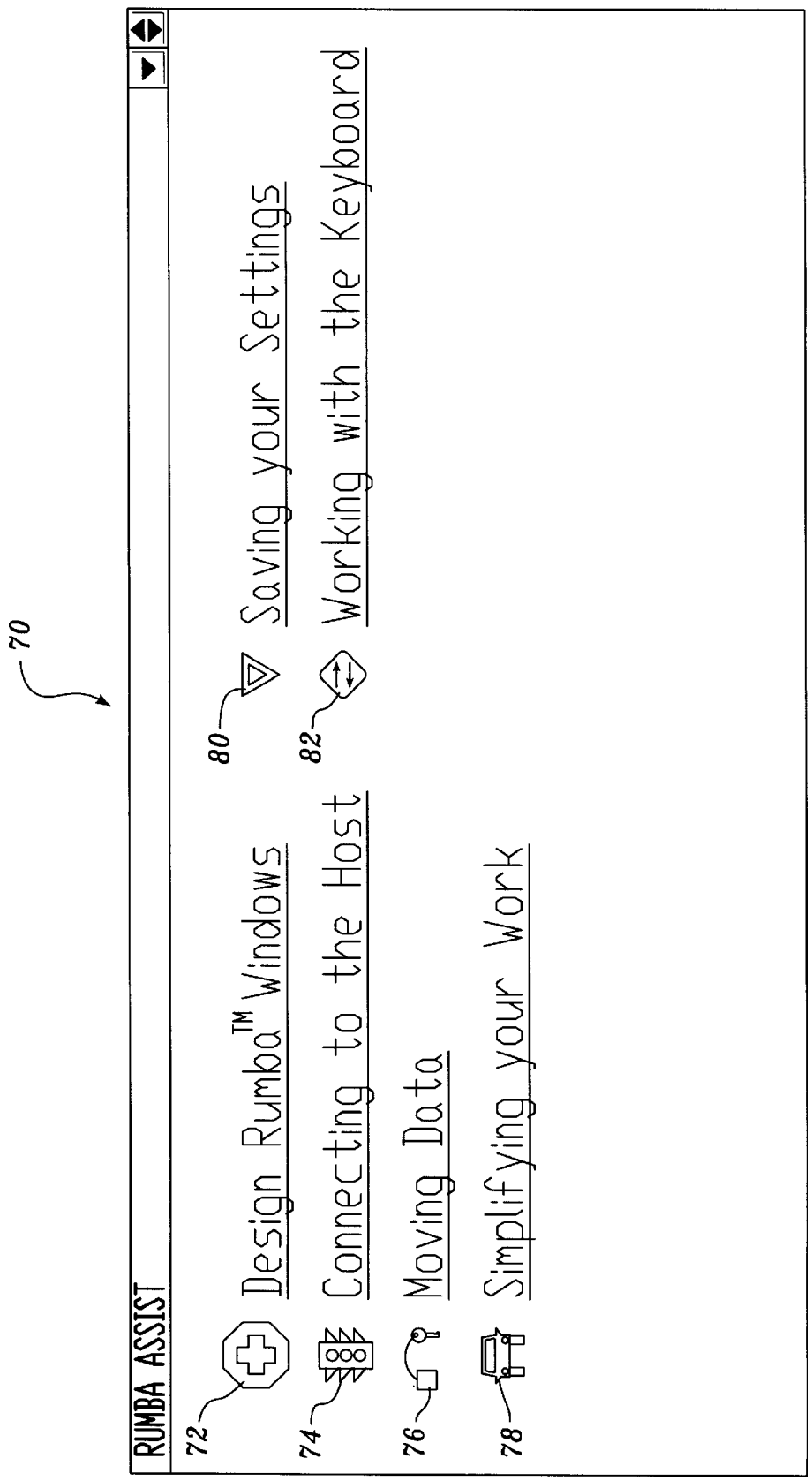
FIG. 3 is an illustrative example of a help screen produced by the present invention.

FIG. 3 illustrates the first display screen produced by the help system of the present invention when a user has requested help from an underlying program. When the user selects the help system, the window in which the underlying program was displayed is overwritten by a help screen 70 that displays a series of icons or context jumps 72, 74, 76, ... 82, that symbolize the topic about which information can be obtained. To view the information on a given topic, the user places a cursor over the corresponding icon and selects it. The user may then be presented with further subtopics to select in order to narrow the topic about which help is desired.

Figure 4:
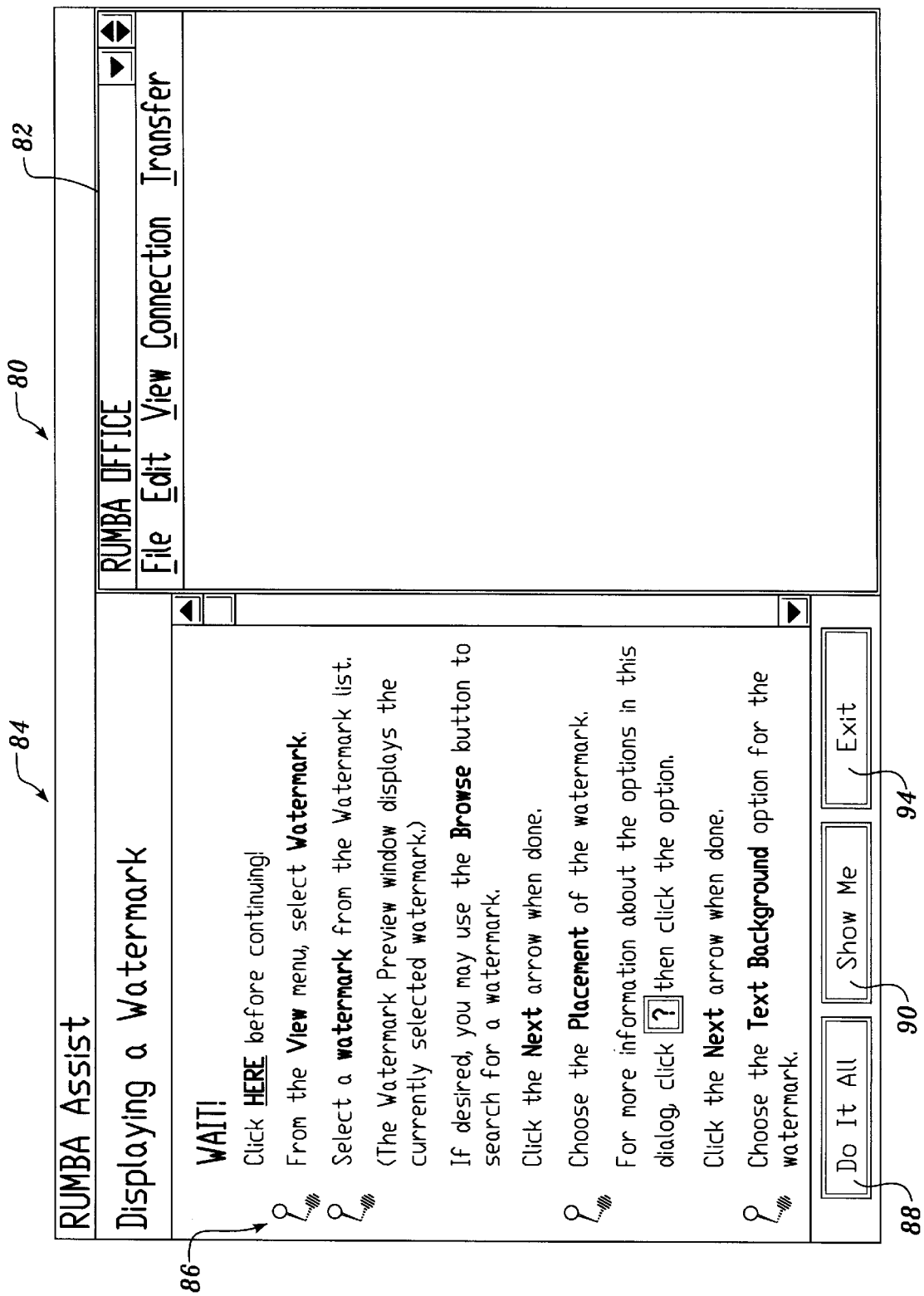
FIG. 4 is a representation of the simultaneous display of the help system according to the present invention and an underlying computer program in which help is desired.

Once the user has found the topic about which information is desired, the help system of the present invention generates a screen 80 like that shown in FIG. 4. The screen 80 is comprised of two sections. The first section 82 is a re-sized window of the underlying program that was operating when the user requested help. Surrounding the window 82 of the underlying program is a help window 84 in which the sequence of steps required to complete a task are shown. Preferably, the window 82 of the underlying program is always displayed as the same size, so that if the window of the underlying application were originally larger than the area of the area of the window 82, the window of the underlying application will be made to appear smaller than before. Alternatively, if the underlying application were running in a window that is smaller than the area of the window 82, then the size of the window in which the underlying application is running will be increased.

In the help window 84 is a list of sequential steps required to perform a given task. Adjacent each step in the list is an indicator 86 that shows whether the step has been completed. For example, the current indications 86 are shown as push pins. However, other icons such as radio buttons or differently shaped bullets could be used. To use the help system, the user reads the instructions in the list and completes each step within the underlying program window 82. After the user has completed a step, the help system changes the status of the indicator 86 adjacent the step to confirm that the step was properly accomplished.

In the lower left-hand corner of the help window 84 is a "do-it-all" button 88. This button causes the help system to complete each step in the list of steps so the user can watch. The do-it-all button may be faster than performing each step by hand and therefore serves as a shortcut to complete a task.

A "show-me" button 90, also disposed at the bottom of the help window 84, operates to illustrate the next step in the series of steps required to complete a desired task. For example, if the user is unsure where to place the cursor, the user selects the show-me button 90 and the cursor is moved by the help system to the appropriate spot in the window 82 of the underlying program and the step is executed.

An "exit" button 94 closes the help program of the present invention and returns the user to the underlying application with the changes made that were performed while the help system was running.

Figure 5:
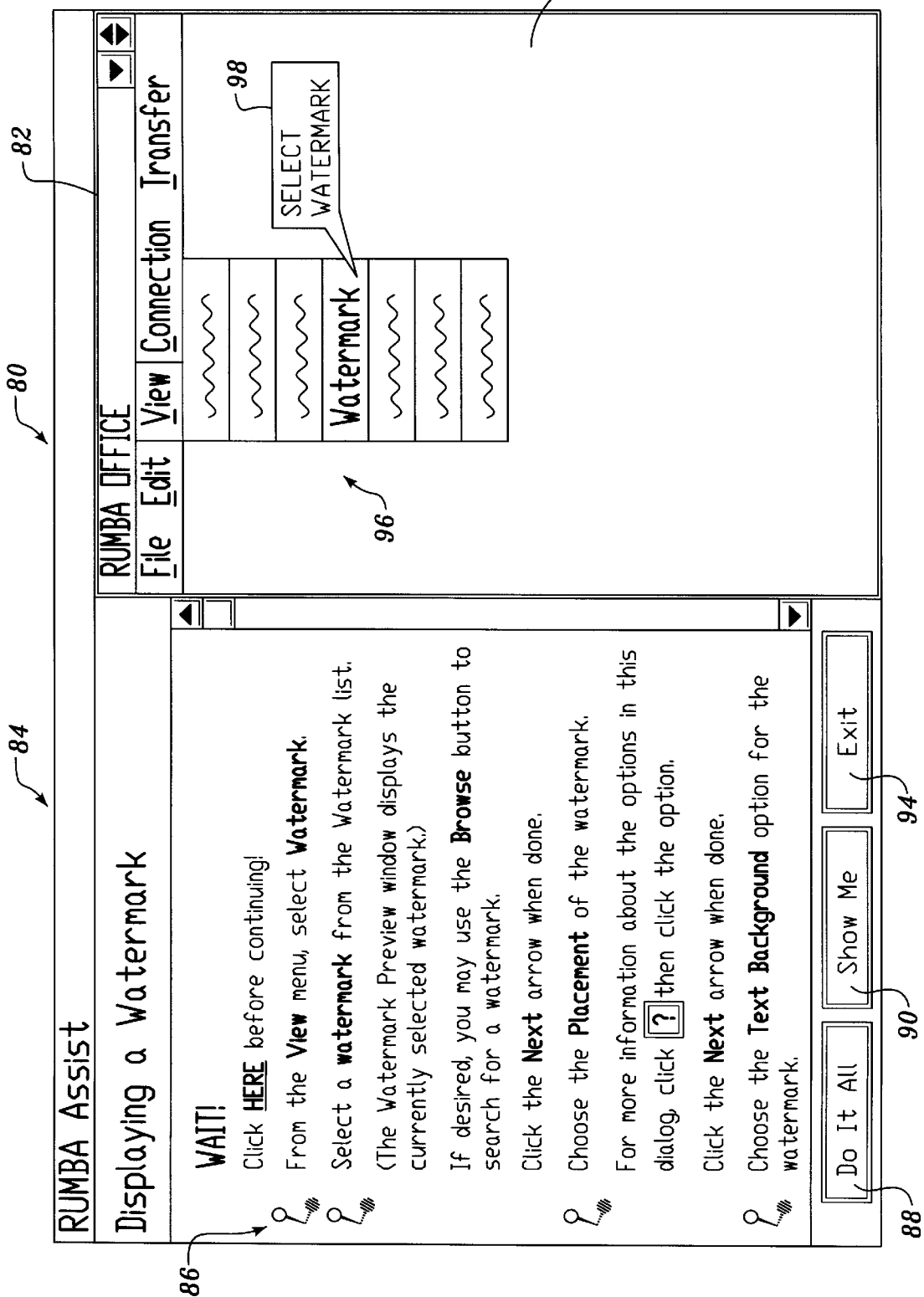
FIG. 5 is a representation of how the help system according to the present invention operates to illustrate a step required to complete a desired task.

FIG. 5 illustrates how the present invention operates to show a user how a step is performed. The cursor is moved by the computer system over the correct position in the underlying program window 82 and the application is caused to respond to the cursor as if the user had made the command by hand. For example, when the help system instructs the user to select the "View" menu, the cursor is placed at the correct position in the window 82 and the View menu 96 is brought down. In addition, the help system may place a balloon or bubble indicator 98 at the appropriate position in the window that informs the user what to do next.

Figure 6:
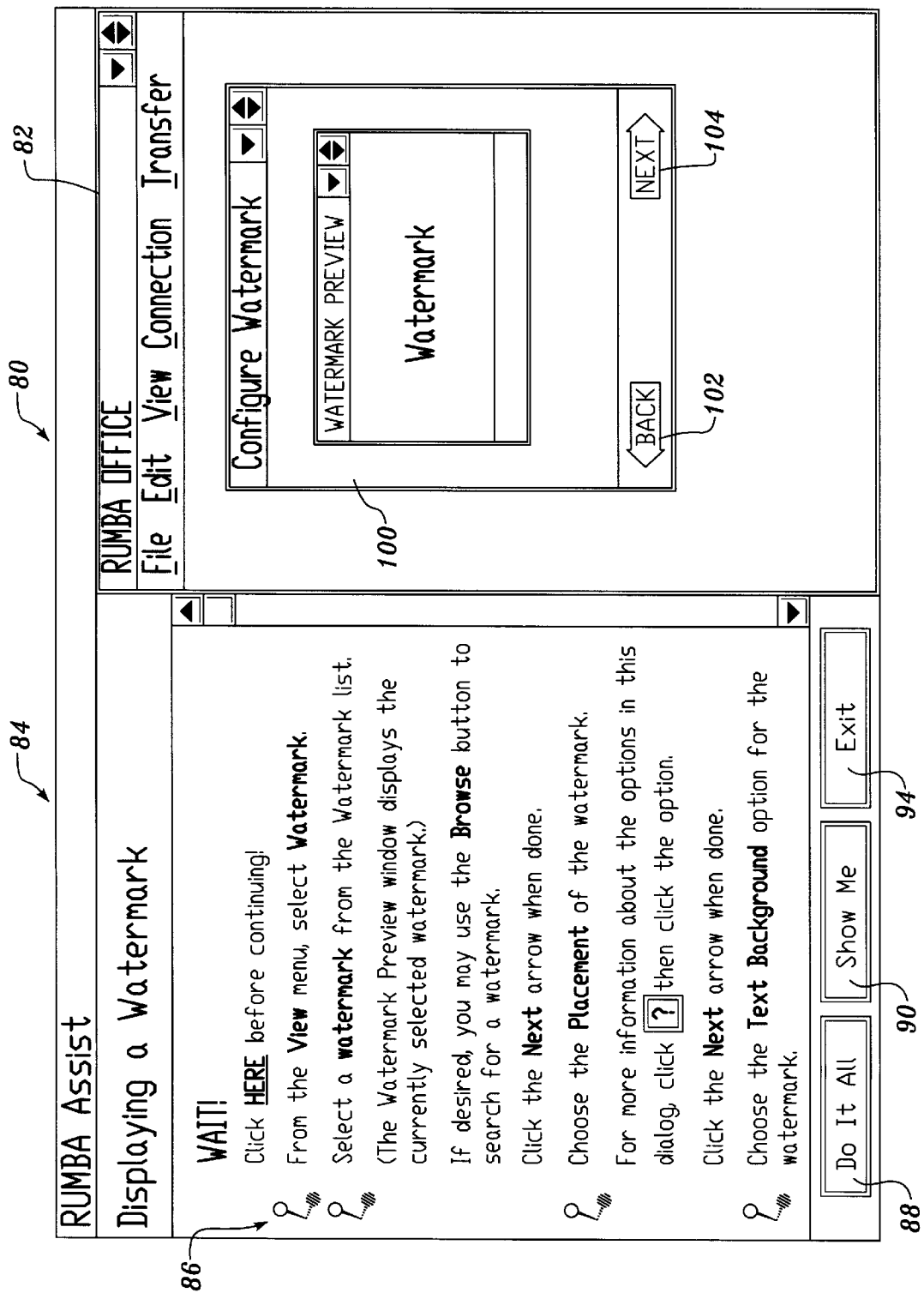
FIG. 6 is a representation showing how the computer help system of the present invention operates to disable controls that should not be selected by a user in order to complete the desired task.

To prevent the user from selecting the incorrect options in the window 82 of the underlying program, the majority of the window is disabled by placing a crosshatched screen over the active window. The only portions of the window that are not disabled are those that may be selected by the user. For example, FIG. 6 shows a dialog box prompting the user to select a watermark background. Therefore, the majority of the dialog box is disabled except for the controls that allow the user to select a watermark and its placement. By disabling the controls in the active window which the user should not select, the chance that the user can make an error is decreased. The details regarding how the controls in the active window are disabled are described in further detail below.

Figure 7:
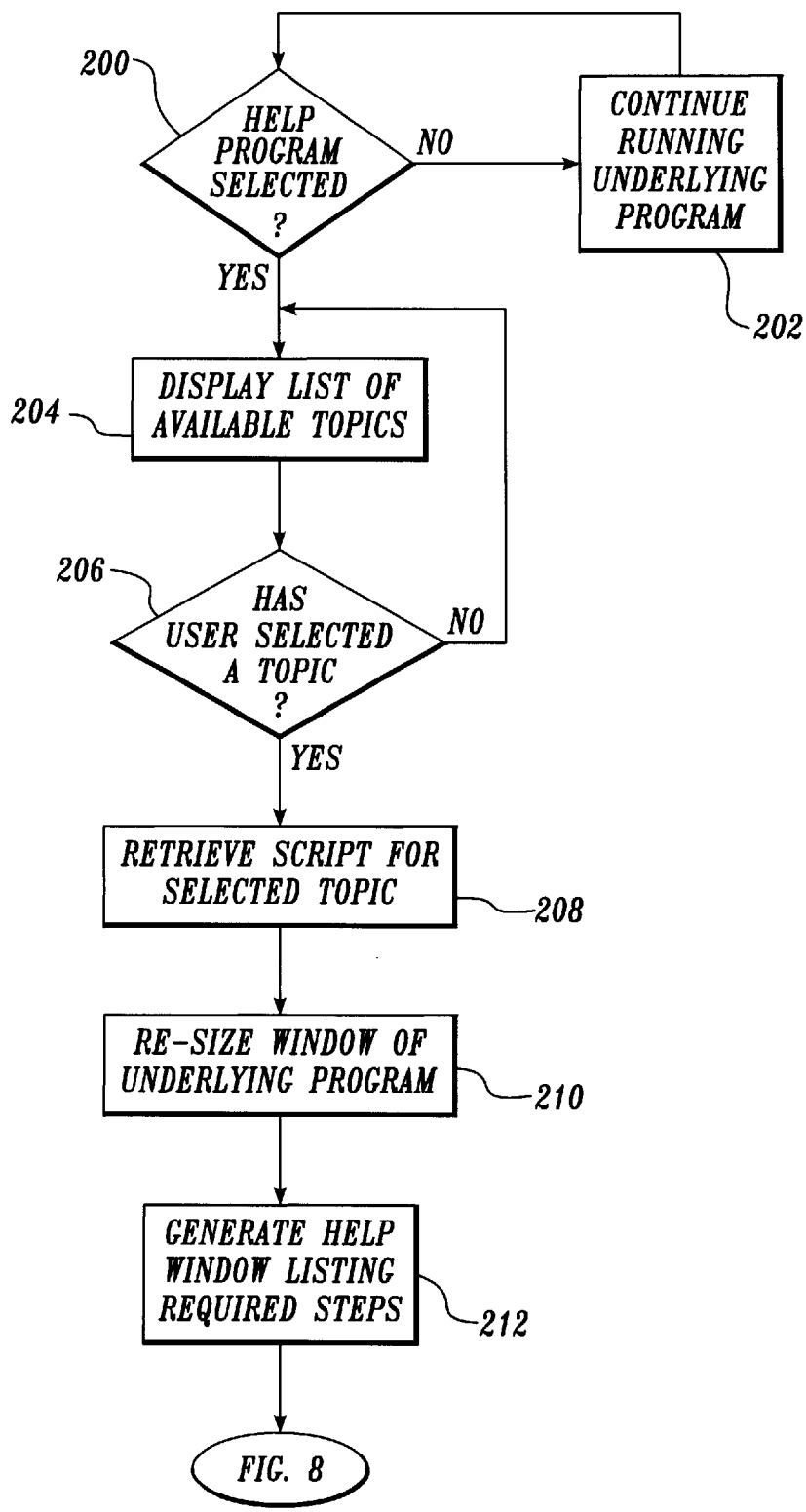
FIG. 7 is a flowchart of the steps performed by the computer system to generate a sequence of steps that instruct a user how to perform a desired task.

FIG. 7 shows the steps performed by the computerized help system of the present invention to allow a user to retrieve information regarding a desired task and to display those steps required to perform the task. Beginning at a step 200, the computer system determines whether the user has selected the help program. If not, the computer system continues to display the underlying application at a step 202 until the help program has been selected. Once the user has requested help through the help program, a window of the type shown in FIG. 3 is created at step 204 that displays a list of topics about which information may be obtained. The computer system then determines whether the user has selected a task or topic from the list at step 206. If no topic is selected, the computer system loops back to step 204 until the user selects an available topic or exits the help program.

Figure 8:
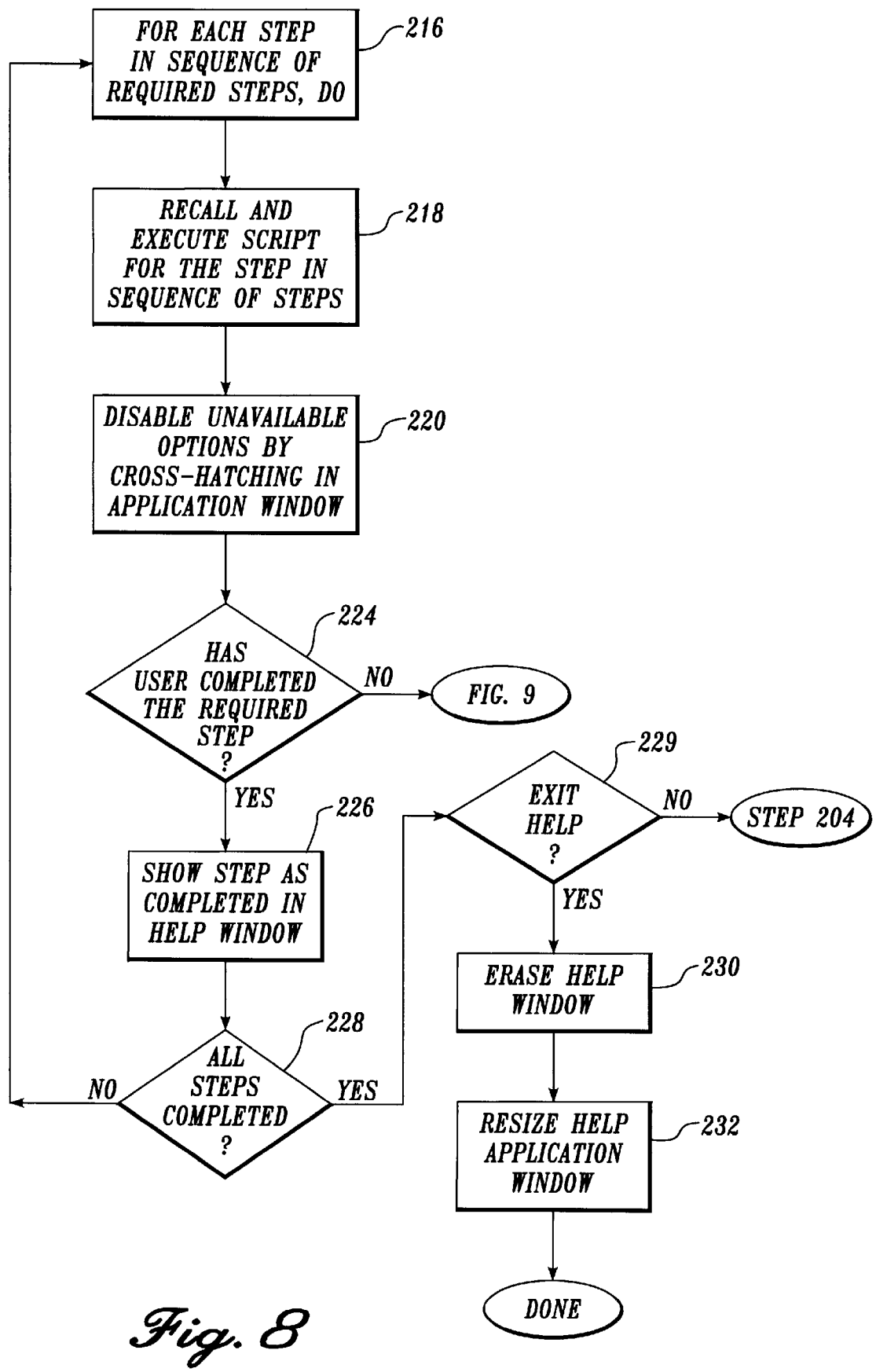
FIG. 8 is a flowchart of the steps performed by the help system of the present invention to show a user how to complete a single step in a sequence of steps.

Following the selection of a topic, the computer system retrieves from memory or the digital storage media a script that informs the help system what information should be displayed for the user at a step 208. At a step 210, the window in which the underlying program is running is re-sized and is placed within the window containing the list of the required steps that is generated at a step 212. Processing then proceeds to the steps shown in FIG. 8.

At step 216, the computer system begins a loop that processes a series of scripts each of which is associated with a step in the list of steps required to complete a given task. At step 218, the computer system recalls a script associated with the step and executes it. At a step 220, the controls in the active window 82 that should not be selected by the user are disabled by overlaying a crosshatched screen over them.

At step 224, the computer system determines whether the user has completed a step. If so, then the indicator adjacent the description of the step is modified to show the step has been completed at a step 226. The computer system then determines whether all steps in the sequence have been completed at a step 228. If not all of the steps have been completed, the computer system returns to step 216 and recalls the next script associated with the next step in the sequence of steps. If all the steps have been completed, the user is asked whether they wish to return to the main help menu or exit the help program at step 229. If the user does not want to exit the help program, processing returns to step 204. If the user wishes to exit the help program, the computer system erases the help window at step 230 and re-sizes the window of the underlying program back to the size of the window before the help system was initiated at step 232.

Figure 9:
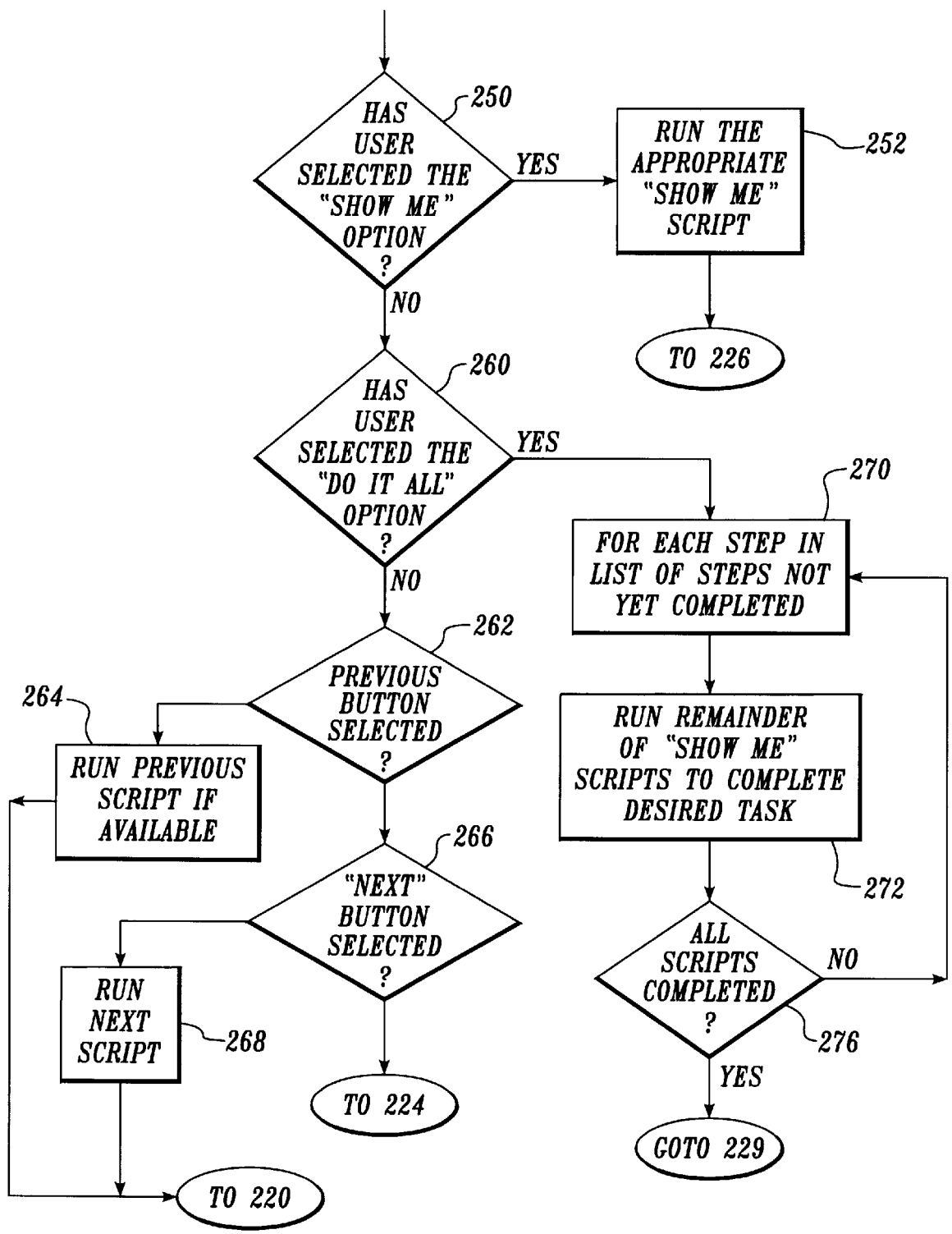
FIG. 9 is a flowchart of the steps performed by the help system of the present invention to show a user how to complete an entire sequence of steps required to implement a desired task.

If the answer to step 224 was no and the user has not completed the desired step, the computer system then determines whether the user has selected the "show-me" option at step 250 (FIG. 9). If so, the computer system runs a "show me" script that causes the computer system to complete the next step. The computer system then returns to step 226 (FIG. 8) and shows that the user has completed the step.

If the answer to step 250 is no and the user has not selected the "show-me" option, the computer system determines whether the user has selected the "do it all" option at step 260. If so, the computer system begins a loop at step 270 that determines which of the required steps have not yet been completed. At a step 272, the computer system runs the remainder of the "show me" scripts to complete the desired task. A step 276 determines whether all remaining scripts have been completed. If not, the computer system returns to step 270. If the answer to step 276 is yes, and all scripts have been completed, the computer system returns to step 229 (FIG. 8) and determines if the user wishes to exit the help program.

In some instances, it is not possible to tell what action a user may take to successfully complete a step. Consequently, the event that signifies the completion of a step cannot be encoded into a script. For example, if a user is given several selections of which any one may be valid, the help system cannot know in advance which selection the user will choose. Therefore, the computer system may add a "back" or "next" button 102, 104 (FIG. 6) to a dialog box so that the user can inform the help system when a step has been completed. The computer system checks to see if these buttons have been selected at steps 262, 266. If so, either the previous or next script is re-run at steps 264, 268.

If the user has not selected the "do-it-all" option or the next/previous buttons, the computer returns to step 224 and awaits the user to make some attempt at performing the required step.

As described above, the help system of the present invention operates to illustrate the steps required to complete a task by running a series of scripts that are dependent upon the particular type of help the user has requested. When the user selects the help menu, a script is run that causes the computer system to display the help window and list of available options as shown in FIG. 3. When the user selects one of the options, the computer system is provided with the name of a script that should be run. The computer system retrieves the script from memory and executes the commands contained in the script.

Script files are small BASIC programs that direct the help program to display the list of steps required to complete a task and to perform the step if the user asks to be shown. In the example given below, the help program is designed to work with the RUMBA® product produced by Wall Data of Kirkland, Wash. The help program is called RUMBA Assist™. However, from the description given, those skilled in the art will recognize how the help program can be readily adapted to other programs. Following the description of how the script files are constructed is a description of the help program that runs the script files.

A typical script consists of four parts: First, it connects to the help program Object Linking & Embedding (OLE) Automation object, allowing the help program to call other methods and set properties in the object. Second, it tells the help program what topic to display in the 'text' window. Third, it sets up what conditions must be met in order for the next step in the list of steps to be executed. Lastly, the script tells the help program what script to execute on completion of the step and what script to execute if the "ShowMe" or "DoItAll" buttons are selected.

The following is a sample script file consisting of the first script of the 'Select a watermark' script.

```
'Global Variables
Dim Rumba As Object
sub main
        on error resume next
        'Create Ole2 automation object. This connects to the help program Automation
        'object
        Set Rumba = CreateObject("RumbaAssistComponent")
        if err<>0 then
                'An error occurred, so inform the user and exit
                MsgBox "Failed to create a link to RUMBA", 0, "RUMBA Assist"
                else
                'Check if the menu item for this lesson exists
```

```
                ItemState=Rumba.GetMenuItemState(Watermark)
                if(ItemState and 3) or (ItemState < 0) then
                        'The item does not exist on the menu
                        call Rumba.MsgBox("Can't find the menu item to perform this task")
                        else
                        'Hide the text window in the help window
                        Rumba.ShowPanel=FALSE
                        'Jump to the first topic. This series of command opens the input file
                        'for the text (lessons and menus)
                        'and jumps the 'waterrnark' text within that file.
                        Call Rumba.TitleOpen("Demo\TutorX.M13")
                        Call Rumba.JumpContext("watermark")
                        'Setting the step tells the help program what pin to push in on the list
                        'of pins
                        Rumba.Step=1
                        'Set up the bitmaps that are to be shown behind the text. These
                        'bitmaps appear in the windows that display the lesson and the main
                        'menu.
                        Call Rumba.SetMVWaterMark("RABkGnd.bmp",
                        SCROLLING_REGION,PARTIAL_SCALE)
                        Call Rumba.SetMVWaterMark("RATitle.bmp",NON_SCROLLING_
                        REGION,FULL_SCALE)
                        'Show the 'lesson' panel, which is the panel that surrounds the
                        'application window and shows the steps
                        Rumba.PanelType=LESSON_PANEL
                        Rumba.ShowPanel=TRUE
                        'Turn on the help bubble (5 second delay)
                        Rumba.BubbleTimeout=5000
                        'From the View menu, choose Watermark.
                        'This tells the help program what to allow the user to do. The
                        'NextActionCtrlType is the type of the action, in this case to select a
                        'menu item. The NextUserAction is the id for the menu item, which
                        'the help program uses to determine if the user has selected the
                        'appropriate item.
                        Rumba.NextUserAction=IDM_WATERMARK
                        Rumba.NextActionCtrlType=TYPE_MENU
                        'This action will create a dialog box need to describe what to subclass.
                        'This is done so the help program will wait until a dialog with the
                        'specified title ("Configure Watermark") is created. It will move on to
                        'the next step only after this dialog appears.
                        Rumba.WillCreateDialog=TRUE
                        Rumba.DialogCaption="Configure Watermark"
                        'Next set of scripts to run. The NextMonitorScript is the script that
                        'will be executed when the current step has been completed, either by
                        'the user or by clicking ShowMe/DoIt. The NextShow Script is the
                        'script that will be executed when "ShowMe" or "DoIt" button is
                        'selected.
                        Rumba.NextMonitorScript="XWatMrk2"
                        Rumba.NextShowScript="XWatMrkA"
                end if
        end if
end sub
```

The above script interacts with the help program that is running simultaneously with the underlying program. As can be seen, the script operates to create a handle to the help program and then determines whether the menu function required to implement the desired task can be selected in the current configuration of the program. Assuming that the menu option is available, the script erases the screen and recalls from memory the appropriate text with the list of instructions that are to be displayed to the user and jumps to the appropriate place in the text. In the example shown, the computer system recalls a file called "demo/TutorX.M13". The computer system then jumps to the context point labeled "WaterMark" within the text.

All the indicators showing the completion of the individual steps are then reset. The statement Rumba.PanelType=LESSON_PANEL causes the computer system to erase the screen display shown in FIG. 3 and to draw the two windows 82 and 84 shown in FIGS. 4, 5, and 6. In addition to configuring the screen each script contains an indication of the next user action to be expected. The help program is looking for this action and will proceed to the next script when the user performs it. The help program has no way of monitoring when the user has performed a given task. Therefore, the script informs the help program what will be the next action that the underlying computer program will take when the user has performed the desired task. For example, in the RUMBA® program, the program creates a dialog box called ConfigureWaterMark after the user selects the WaterMark option from the menu. The script informs the help program of this so that the help program can monitor the list of windows created by the program. When the help program sees the new window created, it knows the desired step has been performed and then executes the next monitor script stored in the variable Rumba.NextMonitorScript. If the user selects the "ShowMe" option at any time, the computer system runs the script that is stored in the location Rumba.NextShowScript. The help program then retrieves the next script and the process repeats until all the scripts have been completed. Each script takes care of changing the status of the indicator (i.e., the pushpin) to indicate that that step has been performed.

The following script is an example of a "ShowMeScript" that causes the help program to automatically select the WaterMark menu.

```
'Global Variable
Dim Rumba As Object
sub main
    on error resume next
    'Create Ole2 automation object to connect to the help program
    Set Rumba = CreateObject("RumbaAssist.Component")
    if err <> 0 then
        MsgBox "Failed to create a link to RUMBA",0,"RUMBA
        Assist"
    else
        'Select the WaterMark menu option for the user.
        Call Rumba.SelectMenu(IDM_WATERMARK)
    end if
end sub
```

As indicated above, it is not always possible to know what step the user may take in order to complete a step. For example, the user may have more than one valid option that could be selected in order to complete the required step. In order to determine when the user has completed the task, the help system of the present invention supplies the "back" and "next" buttons 102, 104 as shown in FIG. 6 that he user selects when he or she has completed the desired task. If the next button is selected, the computer system runs the next script indicated. Conversely, if the previous button is selected, then the previous script (assuming there is a previous script) is run.

The following is another example of a script.

```
'Global Variables
Dim Rumba As Object
sub main
        'Create Ole2 automation object.
        on error resume next
        Set Rumba = CreateObject("RumbaAssist.Component")
        if err <> 0 then
                MsgBox "Failed to create a link to RUMBA",0,"RUMBA Assist"
        else
                Rumba.Step = 2
                'Tell the help program what controls (Buttons, listboxes, etc.) to enable.
                'By default, all controls are disabled (hatched). The help program will punch
                'holes through the hatch and enable
                'the controls specified
                'here. Once again, the controls are referenced by their control id, which
                'needs to be unique on the dialog box
                Call Rumba.SetEnabledCtrl(IDD_WALLPAPER_PREVIEW)
                Call Rumba.Set EnabledCtrl (IDS_VIEW_WALLPAPER_FNAME)
                Call Rumba.SetEnabledCtrl(IDD_VIEW_WALLPAPER_FNAME)
                Call Rumba.SetEnabledCtrl(IDD_VIEW_BROWSE)
                'Set the bubble text. The text defaults to "Click Here" if it is not pointing to
                'a menu item, and to
                '"Click <menuitem name>" if it is pointing to a menu item. This can be
                'overridden, as it is here, to be more descriptive.
                Rumba.BubbleText = "Select a bitmap from this list or click the 'Browse'
                button"
                'The script explicitly tells the help program where to point the help bubble.
                'In this case, the help program is told to point it at the listbox control
                'containing the names of
                'some valid watermarks. Note that the help program is told what type the
                'control is, i.e., TYPE_LISTBOX.
                'This has to be done in some cases where there are two controls on a dialog
                'with the same id. By specifying the type, the help program knows exactly
                'which one I 'want to work with.
                Call Rumba.SetBubbleposition (IDD_VIEW_WALLPAPER_FNAME,
                TYPE_LISTBOX)
                'Since the help program doesn't always know what the user wants to select
                'and the script can't be written to tell when the user has completed the step,
                'the 'Next/Back' box is created having a little window with two 'buttons,
                'Next and
                'Back, which allow the user to go forward (when he is done selecting) or
                'backward (to change a previous option).
                'In this case, he is only allowed to go forward, thus only one script file is
                'specified. When the user clicks the 'Next' button, the Xwatmark3 script will
                'be executed (the next script in the sequence).
                Call Rumba.SetNextBackScripts("XWatMrk3","")
                'Next set of scripts to run. Note that the only time NextMonitorScript will
                'be used in this case is when
                'the user selects "Show Me" or "DoIt" option. This is because the only
                'other way to move to the next step is to
                'press the 'Next button, there is no NextUserAction that will just launch the
                'next script.
                Rumba.NextMonitorScript = "XWatMrk3"
                Rumba.NextShowScript = "XWatMrkB"
        end if
end sub
```

The above script illustrates several additional features of the help program. As indicated in connection with Step 220 described above, the help program operates to disable all the controls of the underlying program except for those controls that should be selected by the user. The script informs the help program which controls should be enabled at any given time. Once the help system has executed the first script for the desired task, it reads what options should be enabled. For example, in the diagram shown in FIG. 5, the user is only allowed to select the View menu. Therefore, everything is disabled except for the view menu.

Once the window has been properly set up and the appropriate controls enabled, the help program waits for a user-generated event, such as the correct mouse click or a menu selection in order to proceed to the next script.

When the next action specified by the script has been successfully completed by the user, the help program will execute the NextMonitorScript which was set in the current script. If ShowMe button was clicked, then the help program will execute the NextShowScript, which will fulfill the requirements set up by the first script, making the help program execute the NextMonitorScript.

The script files described above are manually generated by a script writer working with the underlying program, taking note of the next action that will appear on the screen and noting what controls should be accessed. The help program may call many scripts to complete a task. All the script files are preferably stored on a hard disk within the computer system. Having described how the script files drive the help program, the following describes how the help program itself is constructed. As will be appreciated, the help program is designed to be "dumb" so that it makes as few decisions as possible. Instead the script file dictates all the actions of the help program.

The help program is broken up into several functionally separate pieces. They are as follows:

OLE Automation Interface
COM Object interface
Method/Property handling
Script Execution
Window/Dialog/Control handling
Control subclassing
Windows CBT (Computer Based Training) hook and window subclassing.
Detecting step completion
Hatching
Display of the bubble
Menu handling
Media View control (text and pins)

OLE Automation Interface

Object Linking and Embedding (OLE) Automation is the means that is used for the script files to communicate with the help program. OLE Automation allows the script files to connect to the help program and call methods and properties within the help program. The properties and methods that are supported by the help program are listed below. OLE Automation is part of the Microsoft Windows OLE2 architecture, and is described in detail in a number of readily available books and therefore need not be discussed in further detail.

COM Object interface

The COM (Common Object Model) interface is another OLE interface that is used by the underlying program to interface with help program of the present invention. This is a much more limited interface which is used by the underlying program to start the help program and set some parameters in it. The interface is as follows:

```
DECLARE_INTERFACE_(IWDRUMBAAssist, IUnknown)
{
    //IUnknown Members
    STDMETHOD(QueryInterface)                      (THIS_REFIID, LPVOID*) PURE,
    STDMETHOD_(ULONG, AddRef)                      (THIS) PURE;
    STDMETHOD_(ULONG, Release)                     (THIS) PURE;
    // COM Interface methods
    STDMETHOD_(BOOL, StartRUMBAAssist)             (THIS_HWND, LPSTORAGE, LPCTSTR,
                                                   USHORT, USSHORT) PURE;
    STDMETHOD_(BOOL, CloseRUMBAAssist)             (THIS) PURE;
    STDMETHOD_(BOOL, RunSBLScript)                 (THIS_LPCTSTR) PURE;
    STDMETHOD_(ULONG, SetClientState)              (THIS_ULONG) PURE;
    STDMETHOD_(void, SetScripPath)                 (THIS_LPCTSTR) PURE;
    STDMETHOD_(BOOL, CreateCustomCtrlType)         (THIS_LPCTSTR, USHORT) PURE;
    // Shared COM/Script methods
    STDMETHOD_(BOOL, SetLongVariable)              (THIS_LPCTSTR, LONG) PURE,
    STDMETHOD_(LONG, QueryLongVariable)            (THIS_LPCTSTR) PURE;
    STDMETHOD_(BOOL, SetStrinagVariable)           (THIS_LPCTSTR, LPCTSTR) PURE;
    STDMETHOD_(LPCTSTR, QueryStringVariable)       (THIS_LPCTSTR) PURE;
    // Methods needed for WdRasist.Ocx
    STDMETHOD_(void, SetClientNotifyWindow)        (THIS_HWND) PURE;
    STDMETHOD_(INT, SetMediaViewWindowRects)       (THIS_LPRECT, LPRECT, INT) PURE;
    STDMETHOD_(INT, QueryMediaViewWindowRects)     (THIS_LPRECT, LPRECT) PURE;
};
```

The only methods that are necessary for starting and using the help program are the IUnknown members (since it is a COM object) and StartRUMBAAssist, CloseRUMBAAssist, and RunSBLScript methods. StartRUMBAAssist initializes the COM object, CloseRUMBAAssist uninitializes (but does not remove) the COM object, and RunSBLScript executes a script file (typically the opening script, which displays the menu). The Shared COM/Script functions are used to set variables that the script files can query. This is used to allow the running application to communicate with the scripts. The WdRasist.Ocx methods are not currently used since the help program was not made into an ocx. The SetScriptPath method tells the help program where in the hard drive directory structure to find the script files.

CreateCustomCtrlType allows the underlying program to set up a new control type. Control types are based on the class name of the window. Some controls have pre-defined class types (defined by the help program). For example, a button has the class name "button" and the help program type of TYPE_BUTTON. A listbox has the class name "listbox" and the help program type of TYPE_LISTBOX and so on for all the common control types. The TYPE_ identifiers are simply numeric values that the scripts use to identify different control types to the help program. For example, if the underlying program has a new control for the help program to be able to identify, the underlying program could set this as a new control type by calling CreateCustomCtrlType( "NewCtrlType", TYPE_NEWCTRL) and the scripts could then identify controls with the class name "NewCtrlType".

The help program is started by the underlying program by performing a CoCreateInstance on the help program's COM object, and calling the StartRUMBAAssist method on the returned pointer.

Pitfalls:

Since the help program subclasses all the windows that an application brings up (or at least all the windows it wants to interact with) it is important to not release the help program's COM object from memory until ALL other windows have been destroyed. This is because the windows subclassed may get subclassed again, on top of the existing subclasses. If this happens, the help program cannot release its subclass and just puts the subclass procedure into a 'passthru' mode that sends the data through to the next procedure in the subclass chain. If the help program is removed from the computer memory before this window has been destroyed, the help program will fault because the subclass procedure immediately preceding the help program's subclass procedure will try to call the help program's hook procedure, which no longer exists.

Method/Property handling:

Methods and Properties are called from the scripts. The scripts attach to the help program via the OLE Automation object, and the OLE Automation object calls the appropriate methods/properties in the help program. The methods and properties allow the scripts to control exactly what the help program does. A list of all the help program methods and properties are given below.

Script execution:

The help program uses the Softbridge Basic Language (SBL) to implement its scripts. SBL allows us to compile and execute the SBL scripts. When StartRUMBAAssist is called, the help program looks for all script catalog files (*.sbc) in the scripts directory (set by the SetScriptPath method in the COM object). Since there can be hundreds or thousands of script files, the scripts are pre-compiled and placed into a 'catalog' file, to be extracted when requested. When the help program is told to execute a script, it will first search the catalog files for a script of the same name with .SBX (pre-compiled) appended to it. If it does not find it, it will search for the same file but with a .SBL extension (un-compiled) appended to it. If it still does not find the file, it will look for the .SBL file in the Script directory. If the file is found in the catalog, it is extracted to a read\write directory and compiled (if necessary) into an SBX file. The SBL SblRun function is then invoked the compiled file.

Scripts are executed when:

The criteria for the completion of a step is met (i.e.: a dialog is created, a button is clicked, etc.)

The user selects the 'Next' or 'Back' button

ShowMe is selected, causing the NextShowScript to be executed.

Do It All is selected, causing the help program to alternately execute the NextShowScripts and NextMonitorScripts until user action is required or all the steps are completed.

The current script tells the help program to automatically skip to the NextMonitorScript (Rumub.Skip=TRUE).

The client calls RunSBLScript on the help program's COM object interface.

Window/Dialog/Control handling.

The help program subclasses every window that it may care about. That includes the underlying programs main application window and all of its sub-windows (controls), and any dialogs that are brought up by the underlying program that the help program has been instructed to subclass (see WillCreateDialog and DialogCaption properties). This is so the help program can monitor what the windows are doing and respond accordingly. The following messages are intercepted:

Dialogs/Windows:

WM_SETCURSOR

Used to eliminate unwanted mouseclicks.

WM_COMMAND:

Used to eliminate unwanted menu item/control actions

WM_NOTIFY:

Used to determine when the current tab on a tab control is changing

WM_NCLBUTTONDBLCLK:

WM_NCLBUTTONDOWN:

WM_NCRBUTTONDBLCLK:

WM_NCRBUTTONDOWN:

Used to keep user from sizing the main application window except on one side (the left edge is still active)

WM_ENTERIDLE:

Used during menu selection to let the help program know when a menu popup is done painting.

WM_SYSCOMMAND:

Used to keep the user from closing dialogs before the help program is done with them.

WM_SIZE:

Used to keep the hatch window, help text bubble, and Next-Back dialog in the correct place and correct size

WM_MOVE:

Used to keep the help text bubble and Next-Back dialog in the correct place and correct size

WM_SHOWWINDOW:

Used to show the Next-Back dialog at the appropriate time and to update the hatch window.

WM_INITMENUPOPUP:

Used to tell the help program that a new menu has been opened, and we need to reposition the bubble so it points to the appropriate item on the sub-menu.

WM_MENUSELECT:

Tells the help program when a menu has been closed by the user. If we were looking to click on the menu, we need to go back and open the menu again at this point.

WM_ACTIVATEAPP:

Tells the help program that we need to show the text bubble. We hide it when the application loses activation.

WM_ACTIVATE:

Used to close any popups that the Media View™ help engine may have displayed.

WM_WINDOWPOSCHANGING:

WM_WINDOWPOSCHANGED:

Used to set the help program window behind the underlying program window in the Z-Order.

WM_HELP:

Used so we can eliminate bogus help from appearing when help is invoked on the hatch window.

WM_RBUTTONDBLCLK:

WM_LBUTTONDBLCLK:

Used to eliminate unwanted double click events.

WM_PARENTNOTIFY:

Sometimes a tab on a tabbed dialog box can be created dynamically, and we must subclass it. We get this message in the parent dialog box with a WM_CREATE parameter to let us know to check for a new tab on the dialog.

Tabs:

Tabs on a tabbed dialog box are separate windows, and process a slightly different set of messages. They process a subset of the messages that a normal dialog would process, and use them for the same things. The help program only looks for the following:

WM_SETCURSOR:
WM_COMMAND:
WM_SIZE:
WM_MOVE:
WM_SHOWWINDOW:
WM_INITMENUPOPUP:
WM_MENUSELECT:
WM_NOTIFY:
WM_WINDOWPOSCHANGING:
WM_RBUTTONDBLCLK:
WM_LBUTTONDBLCLK:
WM_HELP:

Controls:

WM_NCHITTEST:

Used to eliminate unwanted mouseclicks.

WM_ENABLE:

Used to keep the application from changing the state of the control. We don't want a control being enabled by the underlying application when the help program explicitly disables it.

WM_DESTROY:

Used to eliminate the information the help program keeps on all controls that are subclassed.

WM_RBUTTONDBLCLK:
WM_LBUTTONDBLCLK:

Used to eliminate unwanted double click events.

WM_PAINT:

Used to monitor when the hatched window needs to be updated. If a control paints, it means that we need to repaint the hatched window on top of it or we get unhatched portions of the underlying program window showing through.

With the preceding set of messages captured from all the dialogs, tabs, controls, and windows the help program can effectively limit what the user is able to do by eliminating those messages it doesn't want the control to know about. It also uses the messages for its own internal state. These are used so the help program knows when the underlying program is active, when the underlying program has a menu item open, and when the underlying program is being moved around on the screen.

Control Subclassing

Controls are subclassed and their enabled/disabled state modified immediately after the execution of each script file. The help program enumerates all the controls on the current dialog/window (the last dialog that was subclassed, as discussed in the next section), subclasses them, and determines the state of each control based on the following parameters, which were set from the script.

DisableControls

Defaults to TRUE. This means that the default state for a control is disabled.

SetEnabledCtrl(Ex)(ControlId, ControlType)

Overrides the 'disabled' setting for the control specified SetRestrictedCtrl(Ex) (ControlId, ControlType)

Overrides the 'enabled' setting for the control specified.

NextUserAction

A single id for a control that will cause the execution of the next script. Always enabled NextActionCtrlType The type of the NextUserAction control.

When a control is enabled, it is both enabled (not grayed out) and has a hole punched through the hatch. When a control is disabled, it is grayed out and covered by the hatched window.

One problem with this is that some controls are created dynamically, well after the routine that subclasses/enables/disables has executed. This means that one or more controls may not be subclassed and their state may not be set. This is worked around by using the Windows CBT hook, as described in the next section.

Windows CBT (Computer Based Training) hook and window subclassing

The help program uses a 'Message Hook' to monitor certain events in the system. In particular, it uses the Windows CBT (Computer Based Training) hook to obtain three events from the running application (See SetWindowsHookEx( ) in the Microsoft Win32 API reference). The help program needs to know when a window is created, activated, or destroyed. This information is used to determine what windows are to be subclassed as described above. The help program takes the following actions:

HCBT_CREATEWND

Check to see if a script has finished executing. If it has, then this could be a new control that should be subclassed and hatched over. This is the case with dialogs that get subclassed, then have controls dynamically created on them.

HCBT_ACTIVATE

Check to see if the window that was activated is one of the windows that the help program are looking for. That is, in the script, the script developer specifies that he is expecting a new dialog or window to appear and tells us the title of that window. In the code for this action, the help program determines if the window that was activated is the one it is looking for. Many times, however, the window doesn't have the title set when the help program gets the activate message. The window is usually not visible at that time either. In this case, the help program subclasses the window with a 'WaitProc' which just waits for the WM_SHOWWINDOW message, unsubclasses itself, and checks for the title. When the help program determines that it has the correct window, it subclasses it and the tab (if it is a tabbed dialog box) that was specified in the script (should be the tab that is currently visible). If the help program subclasses the dialog and WillCreateDialog is true, then the help program launches the NextMonitorScript.

HCBT_DESTROYWND

This method checks to see if it is one of the windows that the help program has subclassed. If it is, the help program unsubclasses at this time. It also must adjust the hatch window to hatch the previous dialog (the dialog/window that was subclassed just before the current dialog). It is here that the help program checks the WillCloseDialog property. This is the opposite of the WillCreateDialog, in that it waits for the dialog to close. When it closes, if WillCloseDialog is true, the help program launches the NextMonitorScript.

Hatching

The disabling is accomplished by creating a semi-transparent window (shown as 100 in FIGS. 5 and 6) that paints a pattern of dots over what is currently on the window shown to the user. To accomplish this, the help system uses a feature of the Microsoft Win32 API. A transparent crosshatched window is created which gets painted on the screen after all updates have been painted. This allows any dialog boxes to be updated before they are disabled.

The crosshatched window, since it is transparent, will receive a WM_PAINT message of its own, so that it can refresh and redraw the hatch on top of any existing dialog boxes in the window. However, there are some limitations. The transparent window does not always receive a WM_PAINT message when a control is painted. In order to get around this problem, everything that the hatch window covers must be "subclassed," meaning that the help program gets to interpret messages sent to the windows before they get to the control. The help program lets the control paint and sets a timer waiting for all painting to subside before painting the hatch over the controls.

The crosshatched window does not cover all the controls on the window screen, otherwise the user would not be able to perform any function. Therefore, the semi-transparent window has holes punched in it where the controls can poke through and be operational. This is accomplished using the "SetWindowRegion" function provided by the Win 32 API which allows a window to be broken into numerous regions. The script file tells the help program what controls it wants to be enabled using the control's ID and control type (i.e., TYPE_MENU, TYPE_BUTTON, TYPE_LISTBOX, etc.), in order to get a placement on the screen of the control itself.

Detecting step completion

A step is complete when the criteria set up by the script is met. Using the subclassing and the CBT hook, the help program can determine when certain events occur. The help program waits for the events that will cause it to launch the next script. In the first script described above, the help program waits for the user to select the IDM_WATERMARK command from the menu. Since the help program also sets the WillCreateDialog property, the program will actually wait for a dialog with the title "Configure Watermark" to appear. This event is noticed in the HCBT_ACTIVATE event (described above). If WillCreateDialog was not set, then the help program would proceed to the next step as soon as it detected the WM_COMMAND message for IDM_WATERMARK. Of course, since the help program would not be expecting a dialog to appear the dialog would not be subclassed.

With the hook procedure and the subclassing, the help program can detect all button/mouse clicks, creation/destruction of windows, menu item selections, tabbed dialog tab changes, listbox/combobox selection changes, and nearly any other user action. Unfortunately, this is not enough. Suppose, for example, the user wants to configure a checkbox. A checkbox can be either 'checked' or 'unchecked'. The checkbox in question is completely arbitrary, in that it is completely a user preference so there is no right or wrong state for the control. The help program will have no idea when the user is finished configuring that control, so it has no way to detect that the step has completed. The only solution is for the user to tell the help program when he/she is finished configuring the option. This is accomplished with the Next/Back dialog. The script writer will know when this sort of problem will exist, so in the script will be the command:

SetNextBackScripts("XWatMrk4","XWatMrk2")

This brings up a small dialog box that tracks with the dialog we are currently working with a Next and/or Back button on it. The XWatMrk4 and XWatMrk2 parameters are the scripts that are to be executed if the Next or Back button is pressed, respectively. This is how a step can be completed without the script having to know what the final state of the control must be.

Displaying the Bubble

The bubble is just sort of a helping hand to lead users through the sequence of steps required to complete a task. The text the bubble displays is dynamic and can be changed from the script files. The bubble will appear if the script indicates a timeout value as well as specifies (directly or indirectly) something for the bubble to point to. The bubble window itself is a region window, much like the hatch, built from two ellipses and two triangles. One ellipse and one triangle are used for the bubble itself, and the other set is used for the shadow. The help program simply figures out how big the ellipse should be ( depends on the text ), where the 'tail' or 'pointer' triangle should be. The Windows SetWindowRgn function is used to cut it out of its surrounding (rectangular) window. The bubble finds its position in the same way the hatch window knows where to punch holes in the hatch. It has a control id and a control type, which can be used to find the rectangle of a control. When pointing to a menu item, it uses the menu selection code (described in the next section) to find the position where it should place the bubble.

Menu handling

Windows menus can be very difficult to work with, especially with Window NT 3.51 and below. In older versions of the OS, there is no easy way to find the rectangle bounding a menu item. In newer versions (those with the new shell) it is less difficult.

The following is a description of the logic the help program uses to finding a menu.

```
If looking for a item on the top level menu (just under the title bar) then:
    Calculate the rectangle of the menu bar. This is done by using
        GetWindowRect and subtracting off the client area.
    get the font windows is using to draw the menu (GetStockObject
        will retrieve this)
    get the width of the letter 'T' using this font
    set the current menu item rectangle to start at the upper left corner
        of the rectangle of the menu bar
    set the height of the current menu item to be
        GetSystemMetrics(SM_CYMENU).
    start at the left end of the menu, and traverse to the right
    while(haven't found it)
        get the text of the current menu item (starting from the left
            end of the menu), and find its width
        set the right edge of the current menu item rectangle to be the left
            edge of the rectangle plus the width of the current menu item
            plus 2 times the width of 'T' (computed earlier). This is the
            spacing between the menu items.
        If this is not the menu item being searched then:
            move right by one and set the left edge of the current menu
item
                rectangle to the right edge of menu item rectangle
            if we have moved beyond the right edge of the menu bar then:
                move the left border of the menu item rectangle to the left
                    edge of the menu rectangle
                add the height of one menu item to the top of the menu
                    item rect.
                add the height of one menu item to the bottom of the
                    menu item rect.
        else
            stop looking
        end if
    end while
else if looking for an item on a submenu (note that the submenu must be
    visible or this doesn't work)
    find the menu popup window (there is only one) using FindWindow
        ("#32768", NULL)
    get both the Client and Window rectangles of the popup window
    calculate the width of the border on the popup (subtract the client
        rect from the window rect to get the border widths)
```

-continued

```
        calculate the height of a menu item in the popup and the height of
a
            separator in the popup
        set the menu item rect to be the window rect of the menu popup
        add the height of the border of the popup to the top of the menu
        item rect if (the current menu item is a separator bar)
            set the bottom of the menu item rectangle to be the top of the
rectangle
                plus the height of the menu item separator
        else
            set the bottom of the menu item rectangle to be the top of the
                rectangle plus the height of a menu item
        end if
        set the current menu item to be the top menu item
        while (the current menu item is not the one we are looking for)
            set the current menu item to the next menu item
            set the top of the menu item rectangle to the bottom of the
menu
                item rectangle
            if (the current menu item is a separator bar)
                set the bottom of the menu item rectangle to be the top of
                    the rectangle plus the height of the menu item
                    separator
            else
                set the bottom of the menu item rectangle to be the top of
                    the rectangle plus the height of a menu item
            end if
        end while
end if
```

The difference in getting the menu item rectangles between the old (preWindows 95) interface and the new interface is that Windows 95 implements a very handy function called GetMenuItemRect. This function has some problems, but it works great to find the top level menu items, which are the more difficult ones to obtain. The help program uses the method described above to find sub-menu items no matter what user interface is being used.

In order for this algorithm to work, both the height of a menu item and the height of a menu separator must be computed. The menu item is easy: In Windows 95 just call GetMenuItemRect on a menu item in a popup window (popup window must be visible), in older versions just use GetSystemMetrics(SM_CYMENU) to obtain the height. Separators are more difficult. When a popup is opened, it must be determined if the popup has any separators. If it does, the number of separators and menu items on it must be counted. Calculate the height of the popup window using GetClientRect on the popup, then subract off the height of all the menu items. What is left is the combined height of the separators. Divide by the number of separators and the height of a single separator is determined.

Mediaview control

The help program of the present invention uses the Microsoft's Mediaview™ 1.3 library with a 3rd party OCX wrapper to display the text/menus/lessons associated with the scripts. This is just a typical help engine, which is embedded in an OLE frame window. When the user selects an option from the menu presented by Mediaview, the help program of the present invention receives an event, which tells it to run a macro. The macro name is the name of the script file, which is promptly executed. Any sort of menu system could be used for this, but using a help engine has the advantage of already supporting context jumps and such.

Given the above description of how the help program of the present invention operates, the following are the properties and methods to be implemented. It is considered to be within the skill of a computer programmer with Windows® experience to complete the source code.

PROPERTIES

Properties hold information on objects. They describe the current state of the object, or they hold values for a method to use.

| | | |
|---|---|---|
| BubbleOrientation | NextShowScript | ShowHatch |
| BubbleText | NextUserAction | ShowPanel |
| BubbleTextID | NLSHostPrefix | Skip |
| BubbleTimeout | NLSLibrary | Step |
| ClientState | PanelType | TabPosition |
| CloseAssist | PrimaryType | WillCloseDialog |
| DialogCaption | SecondaryType | WillCreateDialog |
| DialogCaptionID | SelectedInterface | |
| DisableControls | SelectingInterface | |
| LastScript | SelectionText | |
| NextActionCtrlType | SelectionTextID | |
| NextMonitorScript | ShowMeDelay | |

BubbleOrientation

| | |
|---|---|
| Short | BubbleOrientation<br>Set the BubbleOrientation property to:<br>DONT_CARE<br>BOTTOM_RIGHT<br>BOTTOM_LEFT<br>TOP_RIGHT<br>TOP_LEFT |
| Comments | Use this property to explicitly set the placement of the bubble relative to the control. |
| See Also | SetBubblePosition |

BubbleText bstr     BubbleText

Set the BubbleText property to the string that should appear in the "click here" bubble.

Comments     Default is "Click Here". This value is reset to its default with each new script. Also, if a null string ("") is passed, the default will be used. Insert a carriage return (chr$(10)) in the string to create a line break. The text will be centered per line.

See Also     BubbleTextID, SetBubblePosition

BubbleTextID (This property is PRIVATE, and will not be in user documentation.)

long     BubbleTextID

Set the BubbleTextID property to the NLS ID of the string that should appear in the "click here" bubble.

Comments     Default is IDS_RA_BB_CLICK_HERE. This value is reset to its default with each new script. Also, if zero is passed, the default will be used. The text will be centered per line.

See Also     BubbleText, SetBubblePosition

BubbleTimeout short     BubbleTimeout

Set the BubbleTimeout property to the amount of time in milliseconds that will elapse before the "click here" bubble shows up. If the user makes a mistake before this time-out, the bubble is displayed immediately.

-29-

| | Comments | Default is 0 (Turned Off). This value is not reset to its default with each new script. |
|---|---|---|
| | See Also | SetBubblePosition; BubbleText |

ClientState

| 5 | ClientState | |
|---|---|---|
| | long | ClientState |
| | | The current state of the application that launched RUMBA Assist. When that application is RUMBA, the state will be one of the following: |
| 10 | | DISCONNECTED |
| | | CONNECTED |
| | | CONNECT_PENDING |
| 15 | | When the application is not RUMBA, (a user defined application), this value can be anything the application wants to pass down to the script. This is the same as the ClientState defined in the OCX. |
| | Include Files | RASSIST.SBH |

CloseAssist

| 20 | boolean | CloseAssist |
|---|---|---|
| | | Set the CloseAssist property to cause RUMBA Assist to close immediately upon running the script. |
| | Comments | This field is normally used by (but not restricted to) FastPath scripts, which need to automatically close RUMBA. |
| 25 | | To determine if the script is running in FastPath mode, check the ChainMode property. |
| | | CloseAssist supersedes all other properties and methods. |
| | See Also | ChainMode |

-30-

DialogCaption

| | | |
|---|---|---|
| | bstr | DialogCaption |
| | | Set the DialogCaption property to the string of the dialog box caption (title) to be subclassed. |
| | Comments | Default is NULL. This value is reset to its default with each new script. Either DialogCaption or DialogCaptionID may be set, but it is not necessary to set both. Does NOT Support NLS. Provided for user-customization only. |
| | See Also | DialogCaptionID |

DialogCaptionID (This property is PRIVATE, and will not be in user documentation.)

| | | |
|---|---|---|
| | long | DialogCaptionID |
| | | Set the DialogCaptionID property to the ID value of the dialog box caption to be subclassed. |
| | Comments | Default is NULL. This value is reset to its default with each new script. Either DialogCaption or DialogCaptionID may be set, but it is not necessary to set both. |
| | See Also | DialogCaption |

DisableControls

| | | |
|---|---|---|
| | boolean | DisableControls |
| | | Set the DisableControls to FALSE to enable all controls on a dialog box. |
| | Comments | Default is TRUE (all controls disabled). This value is reset to its default with each new script. |
| | See Also | SetEnabledCtrl, SetRestrictedCtrl |

-31-

| | | |
|---|---|---|
| LastScript | | |
| | boolean | LastScript |
| | | Set the LastScript property to TRUE in final "Monitor" script to indicate completion. Runs the Success Animation and changes the buttons from three buttons: "Do It All," "Show Me," and "Exit" to two buttons: "Main Menu" and "Exit". |
| | Comments | Default is FALSE. This value is reset to its default with each new script. |
| NextActionCtrlType | | |
| | long | NextActionCtrlType |
| | | Set the NextActionCtrlType property to the type of control the user should select. It must be one of the following values. |
| | | This is used in conjunction with NextUserAction. |
| | | Value |
| | | TYPE_MENU<br>TYPE_EDIT<br>TYPE_BUTTON<br>TYPE_LISTBOX<br>TYPE_COMBOBOX<br>TYPE_SLIDEBAR<br>TYPE_SCROLLBAR<br>TYPE_SPINCNTL<br>TYPE_TAB<br>TYPE_NONE |
| | Comments | Default is -1 (unset). This value is reset to its default with each new script. The control ID expected by RUMBA Assist is set by NextUserAction. |
| | See Also | NextUserAction |

NextMonitorScript

| | | |
|---|---|---|
| | bstr | NextMonitorScript |
| | | Set the NextMonitorScript property to the name of the next script that should be invoked if the user completes the current step. |
| 5 | Comments | Default is NULL. This value is not reset to its default with each new script. |
| | See Also | NextShowScript |

NextShowScript

| | | |
|---|---|---|
| 10 | bstr | NextShowScript |
| | | Set the NextShowScript property to the name of the next script that should be invoked if the user elects to have the computer complete the next step. That is, the user selected the "Do It All" or the "Show Me" button. |
| 15 | Comments | Default is NULL. This value is not reset to its default with each new script. |
| | See Also | NextMonitorScript; ShowMeDelay |

NextUserAction

| | | |
|---|---|---|
| 20 | long | NextUserAction |
| | | Set the NextUserAction property to the ID of the control that the user should select. |
| | Comments | Default is 0 (Unset). This value is reset to its default with each new script. The control type is set with the NextActionCtrlType |
| 25 | | property. |
| | See Also | NextActionCtrlType |

-33-

NLSHostPrefix
(This property is PRIVATE, and will not be in user documentation.)

| | | |
|---|---|---|
| bstr | NLSHostPrefix | |

When subclassing a dialog box, set the NLSHostPrefix property to the location of the MRI directory that contains the DLL with the information about the dialog box being subclassed.

| Value | Meaning |
|---|---|
| X | System |
| A | Mainframe |
| N | AS/400 |
| D | UNIX/VAX |

Comments  Default is NULL. This value is reset to its default with each new script. This function probably will change to take integer values.

See Also  NLSLibrary

NLSLibrary
(This property is PRIVATE, and will not be in user documentation.)

bstr  NLSLibrary

When subclassing a dialog box, set the NLSLibrary property to the name of the DLL that contains the appropriate information about the dialog box being subclassed, minus the first letter which is the NLSHostPrefix.

Comments  Default is NULL. This value is reset to its default with each new script.

See Also  NLSHostPrefix

PanelType

| | | |
|---|---|---|
| long | PanelType | |
| | Can be one of the following values: | |
| | MAIN_PANEL | |
| | LESSON_PANEL | |
| Comments | MAIN_PANEL displays the mediaview window without the application. | |
| | LESSON_PANEL displays the MediaView window with the application. | |
| | Set ShowPanel to FALSE before changing PanelType to prevent flickering. | |
| See Also | ShowPanel | |

PrimaryType

| | | |
|---|---|---|
| short | PrimaryType | |
| | RUMBA sets the PrimaryType property to: | |
| | AS400 | |
| | DATABASE | |
| | HP | |
| | MAINFRAME | |
| | MULTI (Notebook page without RUMBA) | |
| | VAX | |
| | When the application is not RUMBA, (a user defined application), this value can be anything the application wants to pass down to the script. This is the same as the PrimaryType defined in the OCX. | |
| Comments | Read-only value. Cannot be set. | |

SecondaryType short  SecondaryType

RUMBA sets the SecondaryType property to:

<u>Value</u>
DISPLAY
PRINTER

When the application is not RUMBA, (a user defined application), this value can be anything the application wants to pass down to the script. This is the same as the SecondaryType defined in the OCX.

Comments  Read-only value. Cannot be set.

SelectedInterface long  SelectedInterface

This property is used when the interface selection dialog is visible, and is used with SelectingInterface.

RUMBA sets this property to the value of the selected interface when SelectingInterface is set to TRUE.

Comments  Default is 0. This value is not reset to its default with each new script.

See Also  SelectingInterface

SelectingInterface boolean  SelectingInterface

Set the SelectingInterface property to TRUE to cause RUMBA Assist to set the SelectedInterface property.

| | | |
|---|---|---|
| | Comments | Default is FALSE. This value is reset to its default with each new script. |
| | See Also | SelectedInterface |

5  SelectionText

| | | |
|---|---|---|
| | bstr | SelectionText |
| | | Set the SelectionText property to the string that the user should select from the listbox. When this string is selected, the next script is called. |
| 10 | Comments | Default is NULL. This value is reset to its default with each new script. Either SelectionText or SelectionTextID may be set, but it is not necessary to set both. Does NOT Support NLS. Provided for user customization only. |
| | See Also | NextUserAction ; NextActionCtrlType |

15

SelectionTextID

(This property is PRIVATE, and will not be in user documentation.)

| | | |
|---|---|---|
| | long | SelectionTextID |
| 20 | | Set the SelectionTextID property to the ID of the item that the user should select from the listbox. When this string is selected, the next script is called. |
| | Comments | Default is 0. This value is reset to its default with each new script. Either SelectionText or SelectionTextID may be set, but it is not necessary to set both. |
| 25 | See Also | SelectionText |

-37-

ShowMeDelay

| | |
|---|---|
| long | ShowMeDelay |
| | When the user hits the Do It All button, they are in DoIt mode. The ShowMeDelay is the amount of time (in milliseconds) to pause before the next showme script runs in DoIt mode. |
| | This is because DoIt mode is so fast that some times you need to pause before the next action so the system can catch up. |
| See Also | NextMonitorScript ;Wait |

ShowHatch

| | |
|---|---|
| boolean | ShowHatch |
| Comments | TRUE displays the hatch. |
| | FALSE hides the hatch. |
| | The hatch is the dark gray covering that hides disabled controls. Some dialogs do not paint correctly when the hatch is displayed. This property is reset to the default (TRUE) before each script is run. |
| See Also | DisableControls; SetEnabledCtrl; SetEnabledCtrlEx; SetRestrictedCtrl; SetRestrictedCtrlEx |

ShowPanel

| | |
|---|---|
| boolean | ShowPanel |
| Comments | TRUE displays RUMBA Assist using the current PanelType. |
| | FALSE hides RUMBA Assist and the application. |
| See Also | PanelType |

-38-

Skip

| | | |
|---|---|---|
| | boolean | Skip |
| | | Set the Skip property to TRUE to allow RUMBA Assist to advance to the next script without a user action. |
| 5 | Comments | Default is FALSE. This value is reset to its default with each new script. |

Step

| | | |
|---|---|---|
| | long | Step |
| 10 | | Set the Step property to indicate the current step. This is used by RUMBA Assist to determine the state of the pins (in or out). |
| | Comments | Default is 0. This value is not reset to its default with each new script. The Last Script needs to have a Step also to push in the last pin. |

15

TabPosition

| | | |
|---|---|---|
| | short | TabPosition |
| | | Set the TabPosition property to specify the tab that the user should select and that needs to be subclassed. Tab positions start with zero. |
| 20 | Comments | Default is -1 (tabless dialog box). This value is reset to its default with each new script. |

WillCloseDialog

| | | |
|---|---|---|
| | boolean | WillCloseDialog |
| 25 | | Set the WillCloseDialog property to indicate whether the user action will close the user dialog box. |
| | Comments | Default is FALSE. This value is reset to its default with each new script. |

-39-

WillCreateDialog

| | | |
|---|---|---|
| boolean | WillCreateDialog | |
| | If NextUserAction will create a dialog box, set this property to TRUE. | |
| Comments | Default is FALSE. This value is reset to its default with each new script. | |

METHODS

Methods are functions that perform actions on the specified object.

| | | |
|---|---|---|
| BranchOnClientState | ScriptFileExists | SetNextBackScripts |
| CtrlHasText | SelectArrow | SetRestrictedCtrl |
| GetMenuItemState | SelectButton | SetRestrictedCtrlEx |
| GetOSVersion | SelectListBoxID | SetStringVariable |
| GetText | SelectListBoxString | SetText |
| IsButtonChecked | SelectMenu | |
| IsListBoxIDSelected | SelectTab | |
| IsListBoxTextSelected | SendKey | SlideControl |
| LockMVOcx | SetBubblePosition | Wait |
| MsgBox | SetEnabledCtrl | |
| MsgBoxID | SetEnabledCtrlEx | |
| PutText | SetLongVariable | |
| QueryCurrentTab | SetMVWaterMark | |
| QueryLongVariable | | |
| QueryStringVariable | | |

BranchOnClientState

| | |
|---|---|
| boolean | BranchOnClientState(*State, timeout, SuccessScript, FailedScript*) |
| long | *State* |
| short | *timeout* |
| bstr | *SuccessScript* |
| bstr | *FailedScript* |

-40-

Parameters  *State*
Desired client state can be:
CONNECTED
NOT_CONNECTED
CONNECT_PENDING.
*Timeout*
Maximum timeout is 60 seconds (in milliseconds)
*SuccessScript*
Name of the script to run when State is reached within the timeout.
*FailedScript*
Name of the script to run when State is NOT reached within the timeout.

CtrlHasText boolean CtrlHasText( *CtrlID, CtrlType* )

The CtrlHasText method determines if there is text in an edit box or combo box.

Parameters  *CtrlID*
ID value of the Edit Control to be tested

*CtrlType*
TYPE_EDIT
TYPE_BUTTON
TYPE_LISTBOX
TYPE_COMBOBOX

Return Value  The Return Value is TRUE if the edit control contains text, and FALSE if the edit control does not contain text.

Comments  Generally used in a showme script.

GetOSVersion long GetOSVersion()

Returns the version of the operating system. Use the following logic to derive the operating system version.

```
ver=Rumba.GetOSVersion()
platform=(ver/65536) and 255
major=(ver/256) and 255
minor=ver and 255
```

Comments In this example, if the operating system version is 4.1, then major is 4 and minor is 1.

GetMenuItemState

**long GetMenuItemState(*MenuID*)**
    long *MenuID*;

The GetMenuItemState method retrieves the state of the given menu item.

Parameters

MenuID

ID value of the menu item.

Return Value The Return Value is -1 if the specified item does not exist. Otherwise, the return is a mask (Boolean OR) of the values from the following list.

| Value | Meaning |
| --- | --- |
| x0000 | Item is enabled and check mark is not placed next to the item |
| 0x0001 | Item is disabled and grayed |
| 0x0002 | Item is disabled |

-42-

| | |
|---|---|
| 0x0004 | Item is a bitmap |
| 0x0008 | Check mark is placed next to the item |
| 0x0020 | Item is placed on a new line (static menus) or in a new column (pop-up menus) with a vertical dividing line |
| 0x0040 | Item is placed on a new line (static menus) or in a new column (pop-up menus) without separating columns |
| 0x0800 | Horizontal dividing line |

GetText

BSTR GetText(*CtrlID, CtrlType*)
long *CtrlID*;
short *CtrlType*;

The GetText method returns the text in the specified control.

Parameters  *CtrlID*
　　　　　　　ID value of the control

*CtrlType*
　　　　　　　Type of control. Possible values are:
　　　　　　　TYPE_MENU
　　　　　　　TYPE_EDIT
　　　　　　　TYPE_BUTTON
　　　　　　　TYPE_LISTBOX
　　　　　　　TYPE_COMBOBOX
　　　　　　　TYPE_SLIDEBAR
　　　　　　　TYPE_SCROLLBAR
　　　　　　　TYPE_SPINCNTL
　　　　　　　TYPE_TAB
　　　　　　　TYPE_NONE

Return Value  The Return Value is the string in the control.

IsButtonChecked boolean IsButtonChecked(*ControlID*)
　　long *ControlID*;

-43-

> The IsButtonChecked method tests the state of a radio button or check box.

Parameters   *ControlID*

> ID value of the radio button or check box to be tested

Return Value   The Return Value is TRUE if the radio button or check box is checked, or FALSE otherwise.

IsListBoxIDSelected (This property is PRIVATE, and will not be in user documentation.)

boolean IsListBoxIDSelected(*ControlID, Id*)
   long *ControlID*;
   long *Id*;

> The IsListBoxIDSelected method tests to see if a given item is selected in a listbox based on its ID.

Parameters   *ControlID*

>> ID value of the listbox

> *Id*

>> ID of the string being tested for selection in the listbox

Return Value   The Return Value is TRUE if the item is selected, and FALSE if the item is not selected.

Comments   Generally used in a showme script.

See Also   IsListBoxTextSelected

IsListBoxTextSelected boolean IsListBoxTextSelected(*ControlID, String*)
   long *ControlID*;
   bstr *Text*;

-44-

The IsListBoxTextSelected method returns whether an item is selected in a listbox.

Parameters   *ControlID*

ID value of the listbox

*Text*

String being tested for selection in the listbox

Return Value   The Return Value is TRUE if the item is selected, FALSE if not selected.

LockMvOcx

**void LockMvOcx(*Lock*)**

boolean *Lock;*

Parameters   *Lock*

Set this to TRUE to prevent the window from painting. This should be done before making a jump to another media view file or jump-string. Call this method again setting *Lock* to FALSE after the jump is made. This helps avoid panel flickering.

Comments   If you call this method with *Lock* set to TRUE, you must call it again with *Lock* set to FALSE or the panel will never change.

PutText

**boolean PutText(*ControlID, ControlType, Text*)**
    long *ControlID;*
    short *ControlType;*
    bstr *Text;*

Parameters

*ControlID*

ID value of the edit control

-45-

*Control Type*

Use the control type constants:

TYPE_EDIT
        TYPE_BUTTON
        TYPE_LISTBOX
        TYPE_COMBOBOX
        TYPE_SCROLLBAR
        TYPE_SLIDEBAR
        TYPE_SPINCNTL
        TYPE_LISTVIEW
        TYPE_TREEVIEW
        TYPE_STATIC
        TYPE_NONE
        TYPE_DEFAULT

*Text*

String to be displayed in the edit control

Return Value    The Return Value is FALSE if the method fails, TRUE if the method is successful.

Comments    PutText enters text into an edit box by pasting from the clipboard. This method may put text after existing text. To replace text, use the SetText method.

See Also    <u>SetText</u>

---

QueryLongVariable

**long QueryLongVariable(*VarName*)**
bstr *VarName*;

The QueryLongVariable method retrieves the value of a persistent script *integer* variable. This variable is created by the SetLongVariable method.

Parameters    *VarName*

Variable name

-46-

Return Value   The Return Value is a long word associated with the given variable name. If this variable is not set, the return value is zero.

Comments   This value is not reset to its default with each new script.

See Also   QueryStringVariable, SetLongVariable, SetStringVariable

QueryStringVariable bstr QueryStringVariable(*VarName*)
bstr *VarName*;

The QueryStringVariable method retrieves the value of a persistent script *string* variable. This variable is created by the SetStringVariable method.

Parameters   *VarName*

Variable name

Return Value   The Return Value is a string associated with the given variable name. If this variable is not set, then the return value is NULL.

Comments   This value is not reset to its default with each new script.

See Also   QueryLongVariable, SetLongVariable, SetStringVariable

MsgBoxID
(This property is PRIVATE, and will not be in user documentation.)

long MsgBoxID(*StringID, Type*)
short *StringID*;
long *Type*;

The MsgBoxID method displays a message in a dialog box containing a bitmap background.

Parameters   *StringID*

ID of string to be displayed

-47-

*Type*
Specifies the contents and behavior of the dialog box.

| Value | Meaning |
|---|---|
| MB_OK | The message box contains one push button: OK. |
| MB_OKCANCEL | The message box contains two push buttons: OK and Cancel. |
| MB_ABORTRETRYIGNORE | The message box contains three push buttons: Abort, Retry, and Ignore. |
| MB_YESNOCANCEL | The message box contains three push buttons: Yes, No, and Cancel. |
| MB_YESNO | The message box contains two push buttons: Yes and No. |
| MB_RETRYCANCEL | The message box contains two push buttons: Retry and Cancel. |

Return Value   The Return Value is the ID of the selected button.

Comments   Generally used in a showme script.

See Also   RUMBAMsgBoxStr

MsgBox

**long MsgBox(*String, Type*)**
bstr *String*;
long *Type*;

The MsgBox method displays a message in a dialog box containing a bitmap background.

Parameters   *String*
String containing the message to be displayed

-48-

*Type*
    Specifies the contents and behavior of the dialog box.

| Value | Meaning |
|---|---|
| MB_OK | The message box contains one push button: OK. |
| MB_OKCANCEL | The message box contains two push buttons: OK and Cancel. |
| MB_ABORTRETRYIGNORE | The message box contains three push buttons: Abort, Retry, and Ignore. |
| MB_YESNOCANCEL | The message box contains three push buttons: Yes, No, and Cancel. |
| MB_YESNO | The message box contains two push buttons: Yes and No. |
| MB_RETRYCANCEL | The message box contains two push buttons: Retry and Cancel. |

Return Value   The Return Value is the ID of the selected button.

ScriptFileExists

**boolean ScriptFileExists ( *Filename* )**
bstr *Filename*;

The ScriptFileExists method tests if a file exists in the current script path (by default, this is the System/Demo directory).

Parameters   *Filename*

Name of file to be found

Return Value   The Return Value is TRUE if the file is found, and FALSE if it is not.

-49-

SelectArrow()

boolean SelectArrow( *long ArrowID* )

| | | |
|---|---|---|
| | Long | *ArrowID* |
| Parameters | | *NEXT_ARROW* |
| | | *BACK_ARROW* |
| Comments | | Use this method to click the Next or Back arrow for the user. Usually used in a ShowMe script. |

SelectButton boolean SelectButton(*CtrlID, ButtonPosition*)
long *CtrlID*;
long ButtonPosition;

The SelectButton method moves the mouse cursor to a button; and then clicks that button.

Parameters   *CtrlID*

ID value of the button control

*ButtonPosition*

Specifies the position (on the control) where the mouse pointer will be placed.
Possible Values:
LEFT
RIGHT
CENTER

Return Value   The Return Value is FALSE if the method fails, TRUE if the method is successful.

Comments   Generally used in a showme script.

-50-

SelectListBoxID

(This property is PRIVATE, and will not be in user documentation.)

5   boolean SelectListBoxID( *ControlID, Id* )
    long *ControlID*;
    long *Id*;

The SelectListBoxID method selects a string from the listbox.

Parameters

10              *ControlID*
                    ID value of the listbox control

*Id*
                    ID of the string to be selected from the listbox

15  Return Value   The Return Value is FALSE if the method fails, TRUE if the method is successful.

Comments      Generally used in a showme script. Either SelectListBoxID or SelectListBoxString may be set, but it is not necessary to set both.

See Also      SelectListBoxString
20

SelectListBoxString boolean SelectListBoxString( *Control, String* )
long *Control*;
bstr *String*;

25              The SelectListBoxString method selects a string from a listbox.
    Parameters

*Control*
                    ID value of the listbox control

*String*
30                  String to be selected from the listbox control

-51-

| | | |
|---|---|---|
| | Return Value | The Return Value is FALSE if the method fails, TRUE if the method is successful. |
| | Comments | Generally used in a showme script. |

SelectMenu boolean SelectMenu( *MenuID* )
    long *MenuID*;

> The SelectMenu method uses the mouse to select a given menu item.

Parameters

> *MenuID*
>
> > ID value of the Menu Item

Return Value The Return Value is FALSE if the method fails, TRUE if the method is successful.

Comments Generally used in a showme script.

SelectTab boolean SelectTab(*TabPos*)
short *TabPos*;

> The SelectTab method uses the mouse to select a tab.

Parameters *TabPos*

> Tab position to be selected. Tab positions are zero based.

Return Value The Return Value is FALSE if the method fails, TRUE if the method is successful.

Comments Generally used in a showme script.

SendKey boolean SendKey(*KeyState, VKValue*)

-52- short *KeyState*;
long *VKValue*;

The SendKey method sends a keystroke to the RUMBA session window.

Parameters

*KeyState*

Specifies the shift state of the key to be sent.

| Value | Meaning |
|---|---|
| 0 | Normal State |
| 1 | Shift State |
| 2 | Control State |
| 3 | Alt State |

*VKValue*

Specifies the VK (virtual key) value of the key.

Return Value The Return Value is FALSE if the method fails, TRUE if the method is successful.

Comments Generally used in a showme script.

SetBubblePosition boolean SetBubblePosition(*ControlID, ControlType*)
long *ControlID*;
short *ControlType*;

Specifies which control the bubble points to.

Parameters *ControlID*

ID value of the Control

*ControlType*

Use the control type constants:
  TYPE_EDIT
  TYPE_BUTTON
  TYPE_LISTBOX

-53-

```
                TYPE_COMBOBOX
                TYPE_SCROLLBAR
                TYPE_SLIDEBAR
                TYPE_SPINCNTL
                TYPE_LISTVIEW
                TYPE_TREEVIEW
                TYPE_STATIC
                TYPE_NONE
                TYPE_DEFAULT
```

Return Value  The Return Value is FALSE if the method fails, TRUE if the method is successful.

Comments  If this method is not called, then the bubble will be point to the control specified by NextUserAction, if defined, or will not appear at all if NextUserAction is not defined.

The default can be specifically requested by using TYPE_DEFAULT as the *ControlType*. In this case, *ControlID* is ignored.

To prevent the bubble from displaying, use TYPE_NONE as the *ControlType*. In this case, *ControlID* is ignored.

To point to a group box, specify the ID of the group box in the *ControlID* parameter, and use TYPE_BUTTON as the *ControlType*.

See Also  BubbleText

SetEnabledCtrl boolean SetEnabledCtrl(*ControlID*)
long *ControlID*;

The SetEnabledCtrl method enables a control in a dialog box. When a dialog box is displayed, the default is for all controls to be disabled.

Parameters  *ControlID*
ID value of the Control.

-54-

| | | |
|---|---|---|
| Return Value | | The Return Value is FALSE if the method fails, TRUE if the method is successful. |
| Comments | | The state of the controls are reset to the default with each new script. Maximum of 20 enabled or restricted controls allowed per script. Generally used in a showme script. |
| See Also | | DisableControls, SetRestrictedCtrl |

SetEnableCtrlEx

**boolean SetEnableCtrlEx(*ControlID,ControlType*)**
long *ControlID*;
short *ControlType*;

The SetEnableCtrlEx method disables a control in a dialog box. Used only when the DisabledControls property is set to FALSE, which enables all controls in a dialog box.

Parameters   *ControlID*

ID value of the Control

*ControlType*

Specifies the type of control. Use the SetEnableCtrl for most cases. This method is for distinguishing between controls with the same window ID. Cannot be used for windows or tabs.

```
Use the control type constants:
TYPE_EDIT
TYPE_BUTTON
TYPE_LISTBOX
TYPE_COMBOBOX
TYPE_SCROLLBAR
TYPE_SLIDEBAR
TYPE_SPINCNTL
TYPE_LISTVIEW
TYPE_TREEVIEW
TYPE_STATIC
```

-55-

| | | |
|---|---|---|
| | Return Value | The Return Value is FALSE if the method fails, TRUE if the method is successful. |
| 5 | Comments | The state of the controls are reset to the default with each new script. Maximum of 20 enabled or restricted controls allowed per script. Generally used in a showme script. |
| | See Also | DisableControls, SetEnabledCtrlEx |

SetLongVariable

**boolean SetLongVariable(*VarName, Val*)**
10    bstr *VarName*;
long *val*;

The SetLongVariable method sets a variable to a long word for use later in a script.

| | | |
|---|---|---|
| | Parameters | *VarName* |
| 15 | | Variable name |
| | | *Val* |
| | | Long value to be associated with the variable |
| | Return Value | The Return Value is FALSE if the method fails, TRUE if the method is successful. |
| 20 | Comments | This variable can be queried using QueryLongVariable. |
| | See Also | QueryLongVariable, QueryStringVariable, SetStringVariable |

SetMVWaterMark

**boolean SetMVWaterMark(*String, Region, Fit*)**
25    bstr *String*;
long *Region*;
long *Fit*;

The SetMVWaterMark method sets the MediaView background.

| | Parameters | *String* | |
| --- | --- | --- | --- |
| | | Bitmap name to be used as the watermark | |
| | | *Region* | |
| | | Where in MediaView to put the bitmap | |
| 5 | | Value | Meaning |
| | | SCROLLING_REGION | Main background |
| | | NON_SCROLLING_REGION | Upper title area |
| | | *Fit* | |
| | | How the bitmap is stretched to fit the area | |
| 10 | | Value | Meaning |
| | | FULL_SCALE | Stretch or shrink bitmap as needed to exactly fit the window. |
| 15 | | PARTIAL_SCALE | Stretch bitmap as needed to fit the window. |

| | | |
| --- | --- | --- |
| | Comments | Default is NULL (no watermark). This value is not reset to its default with each new script. |
| | Return Value | The Return Value is FALSE if the method fails, TRUE if the method is successful. |
| 20 | | |

SetNextBackScripts

**boolean SetNextBackScripts(*Next, Back*)**
    bstr *Next*;
    bstr *Back*;

25                 The SetNextPrevScripts method displays a modeless dialog box with two buttons: Next and Back. When Next is selected, the next script (*Next*) in the sequence is run; when Back is selected, the previous script (*Back*) is run.

| | Parameters | *Next* |
| --- | --- | --- |
| 30 | | Name of script to be run if the Next button is selected. Should be the next script in the sequence. |

-57-

*Back*

Name of script to be run if the Back button is selected.

Return Value  The Return Value is FALSE if the method fails, TRUE if the method is successful.

Comments  Default is None. This value is reset to its default with each new script.

SetRestrictedCtrl

**boolean SetRestrictedCtrl(*ControlID*)**
**long *ControlID*;**

Disables a control in a dialog box. Used only when the DisabledControls property is set to FALSE, which enables all controls in a dialog box.

Parameters  *ControlID*

ID value of the Control

Return Value  The Return Value is FALSE if the method fails, TRUE if the method is successful.

Comments  The control is reset to its default state with each new script. Maximum of 20 enabled or restricted allowed controls per script.

See Also  DisableControls, SetEnabledCtrl

SetRestrictedCtrlEx

**boolean SetRestrictedCtrlEx(*ControlID,ControlType*)**
    **long *ControlID*;**

The SetRestrictedCtrlEx method disables a control in a dialog box. Used only when the DisabledControls property is set to FALSE, which enables all controls in a dialog box.
    **short *ControlType*;**

Specifies the type of control. Use the SetRestrictedCtrl for most cases. This method is for distinguishing between controls with the same window ID. Cannot be used for windows or tabs.

Parameters  *ControlID*

ID value of the Control

*ControlType*

Use the control type constants:
TYPE_EDIT
TYPE_BUTTON
TYPE_LISTBOX
TYPE_COMBOBOX
TYPE_SCROLLBAR
TYPE_SLIDEBAR
TYPE_SPINCNTL
TYPE_LISTVIEW
TYPE_TREEVIEW
TYPE_STATIC

Return Value  The Return Value is FALSE if the method fails, TRUE if the method is successful.

Comments  The control is reset to its default state with each new script. Maximum of 20 enabled or restricted allowed controls per script.

See Also  DisableControls, SetEnabledCtrl

SetStringVariable

**boolean SetStringVariable(*VarName, Value*)**
bstr *VarName*;
bstr *Value*;

The SetStringVariable method sets a variable to a string for use later in a script.

Parameters  *VarName*

Variable name

*val*

-59-

String value to be associated with the variable

Return Value The Return Value is FALSE if the method fails, TRUE if the method is successful.

Comments This variable can be queried using QueryStringVariable.

See Also QueryLongVariable, QueryStringVariable, SetLongVariable

SetText boolean SetText(*ControlID, ControlType, Text*)

long *ControlID*
short *ControlType*
bstr *Text*

Uses the Windows API SetWindowText to change the text of a control. If the control is a text control (such as an editbox or a combobox) it changes the contents of the control.

If the control is not a text control (such as a button or checkbox) it will change the text on the control (ie: you could change the OK button to say "Click here" if desired).

Parameters *ControlID*

The ID of the control.

*ControlType*

Specifies the type of control. Use the SetEnableCtrl for most cases. This method is for distinguishing between controls with the same window ID. Cannot be used for windows or tabs.

Use the control type constants:
- TYPE_EDIT
- TYPE_BUTTON
- TYPE_COMBOBOX
- TYPE_SPINCNTL
- TYPE_STATIC

-60-

| | Comments | This is the exact opposite of GetText, which uses the Windows API GetWindowText. It is different from PutText because puttext cannot change the text of a button/checkbox/etc. and PutText uses the Windows 'Paste' operation to enter text. |
|---|---|---|
| 5 | See Also | GetText |

SlideControl boolean SlideControl(*ControlID, Tics*)
long *ControlID*;
10   short *Tics*;

The SlideControl method uses the mouse to move the slide indicator along the trackbar control.

| | Parameters | *ControlID* |
|---|---|---|
| | | ID value of the trackbar control |
| 15 | | *Tics* |
| | | Number of tic marks to move the slide indicator along the trackbar control. A negative value slides the indicator to the left. A positive value slides the indicator to the right. |
| 20 | Return Value | The Return Value is FALSE if the method fails, TRUE if the method is successful. |
| | Comments | Generally used in a showme script. |

Wait void Wait(*TimeOut*)
25   long *TimeOut*;

The Wait method puts the current process to sleep.

| | Parameters | *TimeOut* |
|---|---|---|
| | | Time in milliseconds that the current process sleeps. |

-61-

| Comment | Use ShowMeDelay for fixing Do It timing problems. Use wait to pause between steps in a ShowMe script. |
|---|---|
| Return Value | None. |
| See Also | ShowMeDelay |

As can be seen from the above, the present invention provides an interactive help system whereby a user is shown how to complete the steps required to complete a desired task. In addition, the steps performed by the user are actually implemented on the underlying program being run by the user. Therefore, when the user leaves the help system, the changes made while the help system was operating will have been implemented. The present invention does not require the user to memorize the list of steps described in the help system and then attempt to recreate them without the benefit of the help system running at the same time. Furthermore, because the present invention disables that portion of the screen containing options not available to the user, the chance that a user will make a mistake during the help process is minimized.

While the preferred embodiment of the invention has been illustrated and described, it will be appreciated that various changes can be made therein without departing from the spirit and scope of the invention.

As can be seen from the above, the present invention provides an interactive help system whereby a user is shown how to complete the steps required to complete a desired task. In addition, the steps performed by the user are actually implemented on the underlying program being run by the user. Therefore, when the user leaves the help system, the changes made while the help system was operating will have been implemented. The present invention does not require the user to memorize the list of steps described in the help system and then attempt to recreate them without the benefit of the help system running at the same time. Furthermore, because the present invention disables that portion of the screen containing options not available to the user, the chance that a user will make a mistake during the help process is minimized.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of operating a computer system to provide help to a user regarding how to complete a desired task in an underlying program comprising the steps of:

determining whether the user has initiated a help program that runs on the computer system;

presenting the user with a list of topics about which help information is available;

determining whether a user has selected a topic from the list of topics;

recalling a script from a memory of the computer system, the script providing the help program with text that describes a sequence of steps required to complete the desired task in the underlying program as well as an indication of what action will be produced by the computer system where the user completes a step of the sequence of the steps and instructing the help program what controls should be enabled in the underlying program;

generating a command to the underlying program that creates a semitransparent window over the underlying program to disable the controls of the under program, the window having one or more holes disposed over the controls that are to be enabled; and repetitively monitoring the underlying program for the indication that the user has completed the step and recalling a next script until each step in the sequence of steps has been completed.

2. The method of claim 1, wherein the help program displays an option to illustrate a step in the sequence of steps, the method further comprising the steps of:

determining whether the user has related the option to illustrate a step and, if so, recalling from memory a script that instructs the help system to send a command to the underlying program to execute the step.

3. The method of claim 1, wherein the help program displays an option to illustrate all the steps required to complete a task, the method further comprising steps of:

determining whether the user has related the option to illustrate all the steps and, if so, recalling from memory a series of corresponding scripts, each of which causes the help program to send a command to the underlying program.

4. The method of claim 1, wherein the user may be able to take more than one action to complete a step, the method further comprising the steps of:

generating a command that will present the user with a button that confirms when a step has been completed; and monitoring the underlying program for an indication that the user has selected the button indicating that the step has been completed and retrieving a next script once the step has been completed.

* * * * *